US012485229B2

(12) United States Patent
Jakobsen et al.

(10) Patent No.: US 12,485,229 B2
(45) Date of Patent: Dec. 2, 2025

(54) REUSABLE TORSION SPRING DRIVEN INJECTION DEVICE

(71) Applicant: Novo Nordisk A/S, Bagsvaerd (DK)

(72) Inventors: Nikolaj Eusebius Jakobsen, Soeborg (DK); Ebbe Kiilerich, Copenhagen (DK); Lee Higson, Tisvilde (DK)

(73) Assignee: Novo Nordisk A/S, Bagsvaerd (DK)

( * ) Notice: Subject to any disclaimer, the term of this patent is extended or adjusted under 35 U.S.C. 154(b) by 568 days.

(21) Appl. No.: 18/014,661

(22) PCT Filed: Jul. 12, 2021

(86) PCT No.: PCT/EP2021/069343
§ 371 (c)(1),
(2) Date: Jan. 5, 2023

(87) PCT Pub. No.: WO2022/013155
PCT Pub. Date: Jan. 20, 2022

(65) Prior Publication Data
US 2023/0248917 A1 Aug. 10, 2023

(30) Foreign Application Priority Data
Jul. 15, 2020 (EP) ..................................... 20185921

(51) Int. Cl.
*A61M 5/315* (2006.01)
(52) U.S. Cl.
CPC .... *A61M 5/31551* (2013.01); *A61M 5/31585* (2013.01)

(58) Field of Classification Search
CPC ................ A61M 5/20; A61M 5/31543; A61M 5/31551; A61M 5/31585; A61M 2005/2407
See application file for complete search history.

(56) References Cited

U.S. PATENT DOCUMENTS

| 10,143,806 | B2 | 12/2018 | Hirschel et al. | |
|---|---|---|---|---|
| 10,537,684 | B2 | 1/2020 | Blancke et al. | |
| 10,722,656 | B2 | 7/2020 | Pedersen | |
| 2010/0114025 | A1 | 5/2010 | Moller | |
| 2014/0312074 | A1 | 10/2014 | Madsen et al. | |
| 2016/0228651 | A1* | 8/2016 | Plambech | A61M 5/31535 |
| 2017/0304551 | A1* | 10/2017 | Eardley | A61M 5/31541 |
| 2017/0312441 | A1 | 11/2017 | Draper et al. | |
| 2018/0064880 | A1* | 3/2018 | Kiilerich | A61M 5/20 |
| 2019/0038842 | A1 | 2/2019 | Pederson et al. | |
| 2021/0146060 | A1* | 5/2021 | Christensen | A61M 5/31563 |
| 2021/0196898 | A1* | 7/2021 | Knudsen | A61M 5/31526 |

FOREIGN PATENT DOCUMENTS

| CN | 103957964 A | 7/2014 |
|---|---|---|
| CN | 107206171 A | 9/2017 |
| EP | 236474 A1 | 9/1987 |
| WO | 20016165 A1 | 1/2001 |

(Continued)

*Primary Examiner* — Cris L. Rodriguez
(74) *Attorney, Agent, or Firm* — Wesley Nicolas

(57) ABSTRACT

The invention relates to an injection device wherein the drive element transferring rotation to the piston rod is divided into two elements which are able to move axially in relation to each other such that the drive mechanism can be released to allow the user to reset the piston rod and change the cartridge.

14 Claims, 15 Drawing Sheets

(56) References Cited

FOREIGN PATENT DOCUMENTS

| WO | 2020053682 A1 | 1/2005 |
|----|---------------|--------|
| WO | 2009049885 A1 | 4/2009 |
| WO | 2014060369 A1 | 4/2014 |
| WO | 2014161952 A1 | 10/2014 |
| WO | 2019002020 A1 | 1/2019 |
| WO | 19175073 | 9/2019 |
| WO | 2020089167 A1 | 5/2020 |

* cited by examiner

Fig. 1 --Prior Art--

(First position)

(Second position)

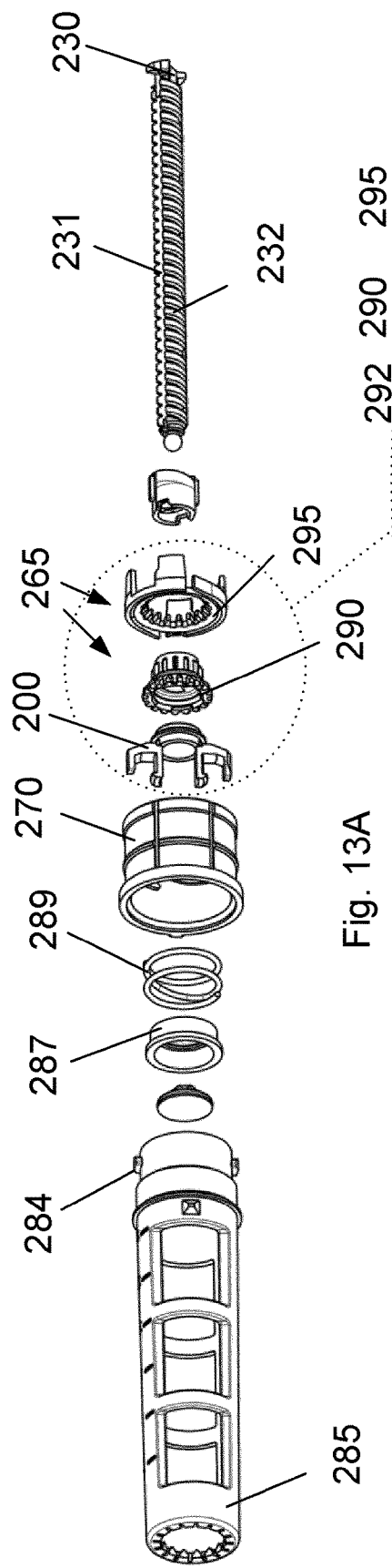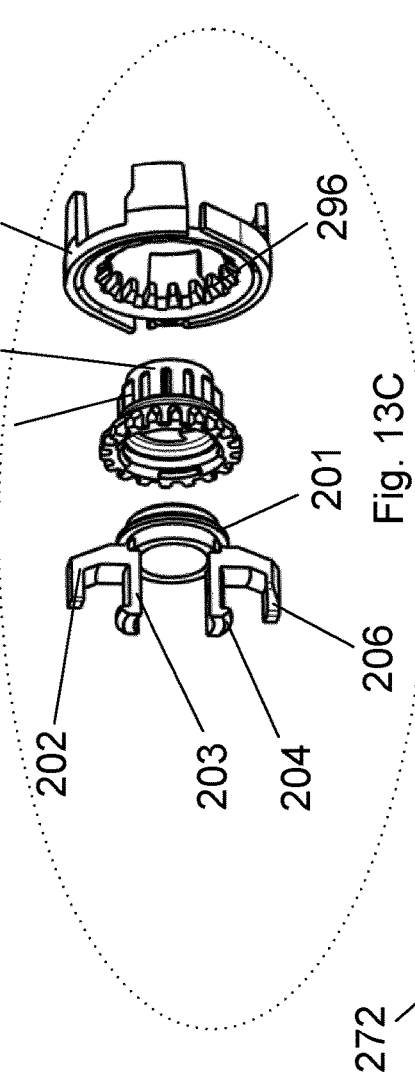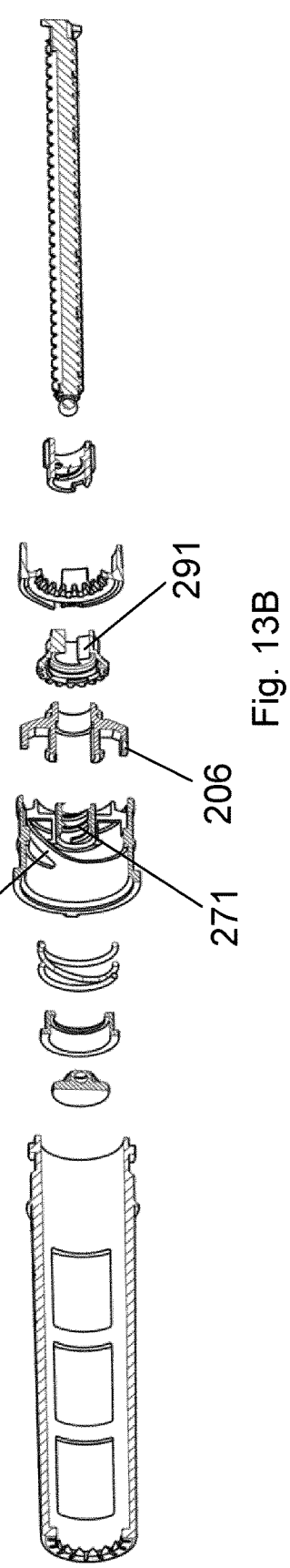

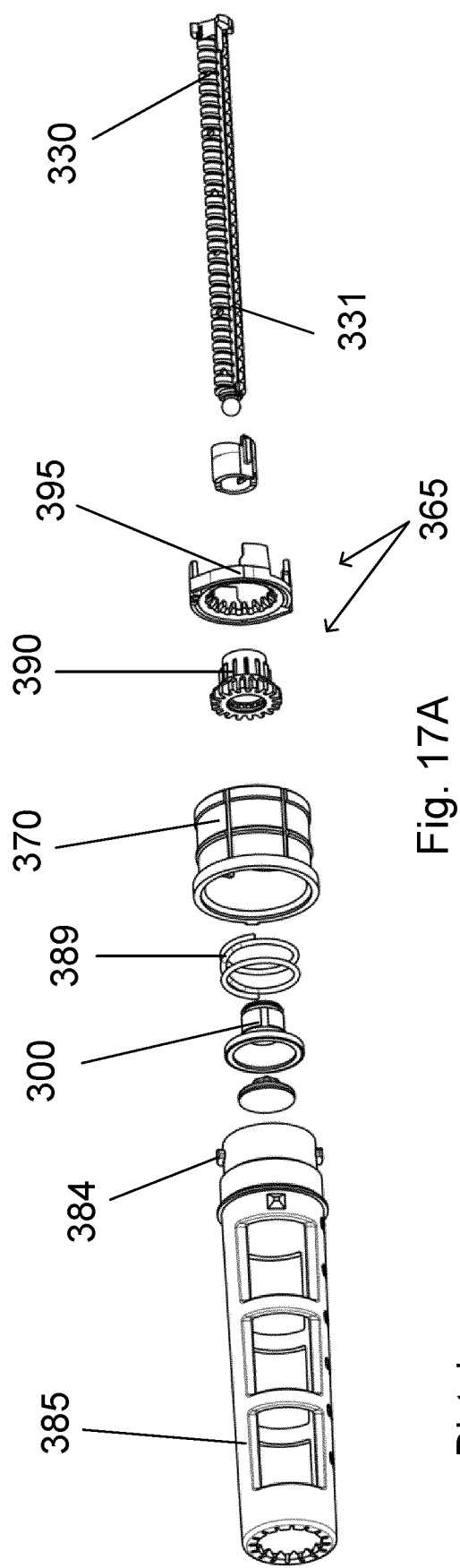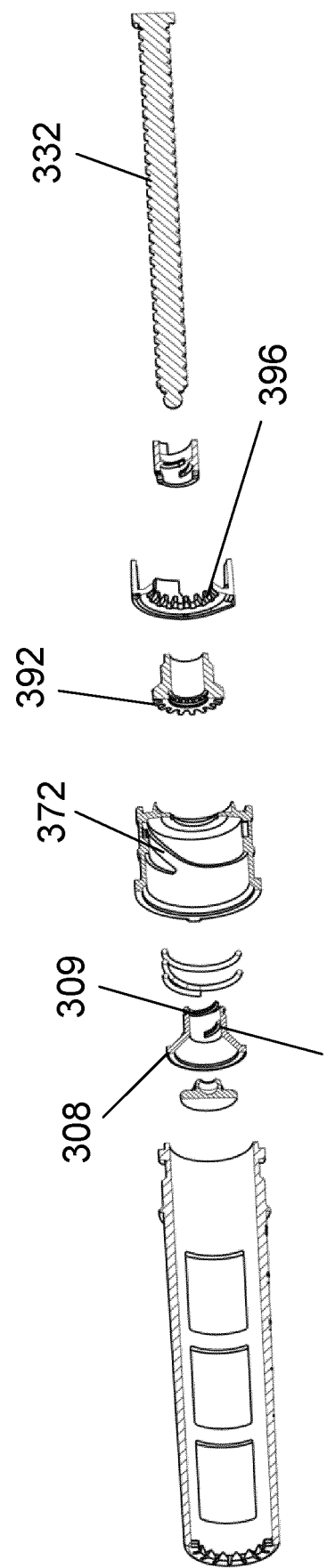

REUSABLE TORSION SPRING DRIVEN INJECTION DEVICE

CROSS-REFERENCE TO RELATED APPLICATIONS

This application is a 35 U.S.C. § 371 National Stage application of International Application PCT/EP2021/069343 (published as WO 2022/013155), filed Jul. 12, 2021, which claims priority to European Patent Application 20185921.2, filed Jul. 15, 2020; the contents of which are incorporated herein by reference.

THE TECHNICAL FIELD OF THE INVENTION

The invention relates to a torsion spring driven injection device for delivering doses of a liquid drug. More specifically, the invention relates to such torsion spring driven injection device wherein the user is able to replace an empty cartridge with a new cartridge and henceforth use the injection device several times.

DESCRIPTION OF RELATED ART

WO 2020/089167 discloses on FIG. 1 to 3, a pre-filled torsion spring driven automatic injection device manufactured by Novo Nordisk A/S under the trade name Flex-Touch®. The drive mechanism comprises a piston rod driver (65) which engages a longitudinal track in the piston rod (30). This piston rod driver (65) is further connectable to a torsion spring (45) which rotates the piston rod driver (65) during does expelling. The connection to the torsion spring (45) is via a clutch (60) which can be shifted in the axial direction by the user pushing the injection button (5). The piston rod (30) is further threaded to the housing through a nut part (70) such that a rotation of the piston rod (30) transports the piston rod (30) helically in the axial direction. Once the content of the cartridge (80) has been expelled and the piston rod (30) has been moved to its most distal position it is not possible to move the piston rod (30) back to its initial position. The injection device is henceforth categorised as a pre-filled injection device and is discarded once the content has been expelled.

U.S. Pat. No. 10,537,684 discloses a manually working injection device wherein the user can replace the cartridge. The drive mechanism is such that a drive nut is threaded to the piston rod and the piston rod is keyed to a lead guide which is anchored in the housing. When the drive nut is rotated, the piston rod is thus translated (i.e. without rotation) in the distal direction. When the user removes the cartridge and the cartridge holder, a compression spring urges the lead guide in the distal direction out of engagement with the housing. When the lead guide is out of its engagement with the housing, the lead guide can be rotated together with the piston rod. During this rotation, the piston rod is moved helically in the proximal direction due to its engagement with the inner thread on the drive nut. When the piston rod has been moved back to its initial position, the user can insert a new cartridge which pushes the lead guide back into the engagement in the housing and the user can re-use the injection device.

DESCRIPTION OF THE INVENTION

It is an object of the present invention to provide a torsion spring driven injection device having a very simple and improved mechanism for releasing the piston rod when changing the cartridge. It is a further object to provide such release mechanism which is suitable for a torsion spring driven injection device.

Accordingly, in one aspect, the present invention relates to a reusable torsion spring driven injection device for expelling doses of a liquid drug from a loaded cartridge. The injection device comprises:
  A piston rod with an outer surface having an outer thread extending helically in a longitudinal direction and which outer surface further is provided with a longitudinal extending engagement surface such as a track or groove,
  A housing structure comprising:
    A base part with a torsion spring driven expelling mechanism for driving the piston rod axially, and
    A removable cartridge holder part for holding the cartridge and being connectable to the base part.

The torsion spring driven expelling mechanism comprises:
  A rotatable piston rod driver engaging the engagement surface of the piston rod such that rotation of the rotatable piston rod driver is transmitted to a similar rotation of the piston rod,
  An internal thread associated with the housing structure and engaging the outer thread on the piston rod such that the piston rod is moved helically when rotated, and
  A strained torsion spring holding a torque for rotating the rotatable piston rod driver during dose expelling.

The rotatable piston rod driver further comprises an outer element and an inner element releasable coupled together:
  The outer element being maintained stationary during dose setting and rotated by the torque of the torsion spring during dose expelling, and
  The inner element being axially movable relatively to the outer element between a first uncoupled position and a second coupled position, The first uncoupled position being a position wherein the inner element is uncoupled from the outer element such that the inner element is rotatable independently of the outer element, and the second coupled position being a position wherein the inner element is coupled to the outer element to follow rotation of the outer element.

According to the invention a movable element operable connected to the inner element is axially movable to move the inner element axially from the first uncoupled position to the second coupled position.

By dividing the piston rod driver into two separate elements which are able to slide axially in relation to each other a very simple and reliable release mechanism can be obtained which are very suitable for a torsion spring driven injection device. In a torsion spring driven injection device, the torque in the torsion spring is preferably secured between injections and while the torque is secured it is thus possible for the user to manipulate the piston rod driver without releasing the torque in the torsion spring. Hence making the piston rod driver a two component construction allows for one part to be moved axially without actuating the other part which can then stay connected to the torsion spring driven expelling mechanism.

The solution is particular suitable for the kind of drive mechanism wherein the piston rod is rotated by the piston rod driver during injection such that part of the piston rod driver can slide translational relatively to the piston rod when exchanging the cartridge.

The movable element is operable connected to the inner element to move the inner element axially. Such movable element can be actuated manually by the user or by the attachment of the cartridge holder part. In the latter case the movable element can be triggered either by the cartridge holder part itself or by the actual cartridge.

In one example the movable element is an element which is axially movable in relation to the housing structure. Such element can be provided on an outer surface of the injection device or internally inside the injection device.

The movable element is operable connected to the inner element such that any axial movement of the movable element is transferred to axial movement of the inner element. The movable element however does not need to be directly coupled to the inner element; the coupling is operable meaning that a movement of the movable element is transferred to a movement of the inner element e.g. via a different element. The term operable connected also implies that the movable element and the inner element are separate parts which however are connected.

In one example the movable element and the inner element move in unison such that any movement of the movable element is transferred one-to-one to the inner element. In a different example a gearing can be provided between the movable element and the inner element.

In the opposite direction, the inner element is preferably moved distally into the first uncoupled position by a spring means. Such spring means are preferably a compression spring provided between a housing part and the inner element. The compression spring preferably urges the movable element in the distal direction which movement is the followed by the inner element coupled to the movable element.

The movable element and hence the inner element are moved proximally into the second coupled position by engagement with the cartridge holder part or by engagement with the cartridge itself. Alternatively, the movable element is moved manually by the user.

In the later example, the movable element is a sleeve or a sleeve-like element which is telescopically movable in relation to the housing structure and preferably manually movable by a user. In order for the user to operate the sleeve this is provided outside the housing structure and hence slides axially on the outside of the housing structure.

By sleeve is here meant a tube-like element which surrounds the injection device. However, the sleeve does not necessarily have to fully surround the injection device. It can also be a sleeve-like element covering less than 360 degrees and can as such have many different appearances. The purpose of the sleeve or sleeve-like element is to transfer axial movement to the inner element and preferably being reachable by a user from the outside on the housing structure.

Inside the housing structure, the sleeve is connected to the inner element such that axial movement of the sleeve is transferred to axial movement of the inner element.

The sleeve is preferably arranged such that the sleeve abuts the cartridge holder part when mounted. Should the user for some reason not manually move the sleeve proximally this is automatically done once the user mounts the cartridge holder part to the remaining housing structure.

In a further example a compression spring is encompassed between the sleeve and housing structure such that the sleeve is automatically moved in the distal direction when the cartridge holder part is removed.

In one example, the movable element is connected to the inner element via an inner ring which is provided between the movable element and the inner element. Spring means such as a compression spring can in such example be provided between the movable element and a housing part such as a nut member secured in the base part of the housing structure.

Such nut member can in one example be press fitted into the housing structure and preferably carries the inner thread for moving the piston rod helically. The movable element is thus able to operate through the nut member by being provided with axial legs operating through openings in the nut member. The compression spring is hence located distal to the nut member whereas the piston rod driver is provided proximally to the nut member.

Definitions

An "injection pen" is typically an injection apparatus having an oblong or elongated shape somewhat like a pen for writing. Although such pens usually have a tubular cross-section, they could easily have a different cross-section such as triangular, rectangular or square or any variation around these geometries.

The term "Needle Cannula" is used to describe the actual conduit performing the penetration of the skin during injection. A needle cannula is usually made from a metallic material such as e.g. stainless steel and preferably connected to a hub made from a suitable material e.g. a polymer. A needle cannula could however also be made from a polymeric material or a glass material. The hub and the needle cannula together are often referred to as a "needle assembly". The hub usually carries connection means for connecting the needle assembly to an injection device. The ""connection means" could as examples be a luer coupling, a bayonet coupling, a threaded connection or any combination thereof.

As used herein, the term "Liquid drug" is meant to encompass any drug-containing flowable medicine capable of being passed through a delivery means such as a hollow needle cannula in a controlled manner, such as a liquid, solution, gel or fine suspension. Representative drugs include pharmaceuticals such as peptides, proteins (e.g. insulin, insulin analogues and C-peptide), and hormones, biologically derived or active agents, hormonal and gene-based agents, nutritional formulas and other substances in both solid (dispensed) or liquid form.

"Cartridge" is the term used to describe the container actually containing the drug. Cartridges are usually made from glass but could also be moulded from any suitable polymer. A cartridge or ampoule is preferably sealed at one end by a pierceable membrane referred to as the "septum" which can be pierced e.g. by the non-patient end of a needle cannula. Such septum is usually self-sealing which means that the opening created during penetration seals automatically by the inherent resiliency once the needle cannula is removed from the septum. The opposite end of the cartridge is typically closed by a plunger or piston made from rubber or a suitable polymer. The plunger or piston can be slidable moved inside the cartridge. The space between the pierceable membrane and the movable plunger holds the drug which is pressed out as the plunger decreased the volume of the space holding the drug.

The cartridges used for both pre-filled injection devices and for durable injections devices are typically factory filled by the manufacturer with a predetermined volume of a liquid drug. A large number of the cartridges currently available contains either 1.5 ml or 3 ml of liquid drug.

Since a cartridge usually has a narrower distal neck portion into which the plunger cannot be moved not all of the liquid drug contained inside the cartridge can actually be expelled. The term "initial quantum" or "substantially used" therefore refers to the injectable content contained in the cartridge and thus not necessarily to the entire content.

By the term "Pre-filled" injection device is meant an injection device in which the cartridge containing the liquid drug is permanently embedded in the injection device such that it cannot be removed without permanent destruction of the injection device. Further, in a pre-filled device it is usually not possible to move the piston rod back to its initial position, hence such pre-filled injection device can only be used as long as the piston rod is moved in the direction emptying the cartridge. Once the pre-filled amount of liquid drug in the cartridge is used, the user normally discards the entire injection device. Usually the cartridge which has been filled by the manufacturer with a specific amount of liquid drug is secured in a cartridge holder which is then permanently connected in a housing structure such that the cartridge cannot be exchanged.

This is in opposition to a "Durable" injection device in which the user can himself move the piston rod back to its initial position and change the cartridge containing the liquid drug whenever it is empty. It is thus possible to re-use the injection device several times. Pre-filled injection devices are usually sold in packages containing more than one injection device whereas durable injection devices are usually sold one at a time. When using pre-filled injection devices an average user might require as many as 50 to 100 injection devices per year whereas when using durable injection devices one single injection device could last for several years, however, the average user would require 50 to 100 new cartridges per year.

"Scale drum" is meant to be a preferably cylinder shaped element carrying indicia indicating the size of the selected dose to the user of the injection device. The cylinder shaped element making up the scale drum can either be solid or hollow. "Indicia" is meant to incorporate any kind of printing or otherwise provided symbols e.g. engraved or adhered symbols. These symbols are preferably, but not exclusively, Arabian numbers from "0" to "9". In a different example, alphabetic letters from any alphabet available can be used. However, the symbols can also be graphical pictures indicating a specific situation or specific use such symbols could e.g. be a key, a lock, a drop or similar symbol which provides the user information relating to the use of the injection device. In a traditional pen configuration, the indicia is viewable through a window or opening provided in the housing structure.

Using the term "Automatic" in conjunction with injection device means that, the injection device is able to perform the injection without the user of the injection device delivering the force needed to expel the drug during dosing. The force is typically delivered—automatically—by an electric motor or by a spring drive. The spring for the spring drive is usually strained by the user during dose setting, however, such springs are usually prestrained in order to avoid problems of delivering very small doses. Alternatively, the spring can be fully preloaded by the manufacturer with a preload sufficient to empty the entire drug cartridge though a number of doses. Typically, the user activates a latch mechanism provided either on the surface of the housing or at the proximal end of the injection device to release—fully or partially—the force accumulated in the spring when carrying out the injection.

The term "protective cap" is herein meant to refer to a cover or a sleeve-like structure which is mounted at the distal end of the injection device between injections. Such cover or sleeve-like structure is usually closed at the distal end to fully encapsulate the distal part fo the injection device. The protective cap is hence secured to the distal end of the injection device and protects the distal end of the injection device between injections. Should a needle cannula be mounted to the distal end of the injection device, either permanently or exchangeable, such needle cannula is henceforth also protected by the protective cap. Since the protective cap is mounted each time an injection has been performed, the word "remounted" can also be used to describe the mounting of the protective cap. Further, since the housing structure of an injection device often has a window through which the user can visually inspect the liquid drug, the protective cap also serves to protect the liquid drug from long time exposure to light as some liquid drugs are sensitive to light, especially in the UV range.

The term "Permanently connected" or "permanently embedded" as used in this description is intended to mean that the parts, which in this application is embodied as a cartridge permanently embedded in the housing, requires the use of tools in order to be separated and should the parts be separated it would permanently damage at least one of the parts.

All references, including publications, patent applications, and patents, cited herein are incorporated by reference in their entirety and to the same extent as if each reference were individually and specifically indicated to be incorporated by reference and were set forth in its entirety herein.

All headings and sub-headings are used herein for convenience only and should not be constructed as limiting the invention in any way.

The use of any and all examples, or exemplary language (e.g. such as) provided herein, is intended merely to better illuminate the invention and does not pose a limitation on the scope of the invention unless otherwise claimed. No language in the specification should be construed as indicating any non-claimed element as essential to the practice of the invention.

The citation and incorporation of patent documents herein is done for convenience only and does not reflect any view of the validity, patentability, and/or enforceability of such patent documents.

This invention includes all modifications and equivalents of the subject matter recited in the claims appended hereto as permitted by applicable law.

BRIEF DESCRIPTION OF THE DRAWINGS

The invention will be explained more fully below in connection with a preferred embodiment and with reference to the drawings in which:

FIG. 13A show an exploded view of a second example of the injection device according to the invention.

FIG. 13B show an exploded and cross-sectional view of the second example of the injection device according to the invention.

FIG. 13C show a carved-out portion of FIG. 12A as indicated by dotted lines.

FIG. 17A show an exploded view of a third example of the injection device according to the invention.

FIG. 17B show exploded and cross-sectional view of the third example of the injection device according to the invention.

The figures are schematic and simplified for clarity, and they just show details, which are essential to the understanding of the invention, while other details are left out. Throughout, the same reference numerals are used for identical or corresponding parts.

DETAILED DESCRIPTION OF EMBODIMENT

When in the following terms as "upper" and "lower", "right" and "left", "horizontal" and "vertical", "clockwise" and "counter-clockwise" or similar relative expressions are used, these only refer to the appended figures and not to an actual situation of use. The shown figures are schematic representations for which reason the configuration of the different structures as well as their relative dimensions are intended to serve illustrative purposes only.

Figure 1:
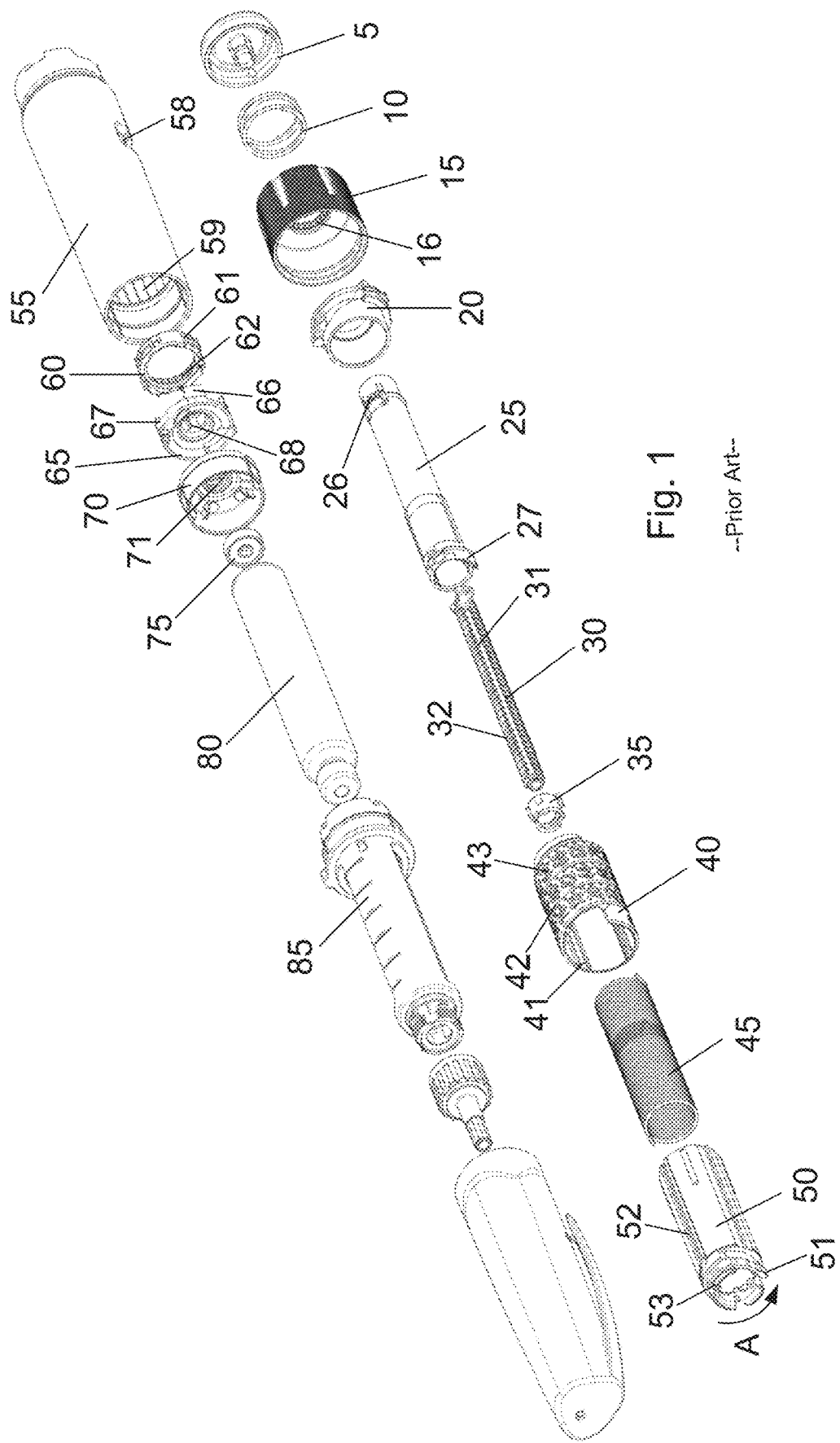
FIG. 1 show an exploded view of an example of a prior art torsion spring driven pre-filled injection device.

In that context it may be convenient to define that the term "distal end" in the appended figures is meant to refer to the end of the injection device securing the needle cannula and pointing towards the user during injection, whereas the term "proximal end" is meant to refer to the opposite end which usually carries the injection button as depicted in FIG. 1. Distal and proximal is meant to be along an axial orientation extending along the longitudinal axis (X) of the injection device as also disclosed in FIG. 2.

When referring to clockwise and counter-clockwise in the following examples it is understood that the injection device is viewed from the distal face i.e. from a position distal to the injection device. Clockwise is thus rotation towards the right as the arms of a clock and counterclockwise is towards the left.

To explain the various movements taken place in the injection device described, the following terminology are used throughout the following examples;

"Translational movement" is meant to be a strictly linear movement in the axial direction but without any rotation.

"Rotational movement" is any movement of rotation around a centre which centre can be a centre point i.e. in one planar or a centre axis i.e. having a longitudinal extension.

"Axial movement" means any movement in an axial direction e.g. along the centre axis. Such movement can be a strictly translational movement or include a rotational movement which thus makes it a "Helically movement" as this is meant to be the combination of a translational movement and a rotational movement.

"Telescopic" is meant to cover the situation in which a movable element moves out from, or into, a base element. The movement can be translational i.e. without any rotation, or the movement can include a rotation thus making the telescopic movement helical.

EXAMPLE OF PRIOR ART

Figure 2:
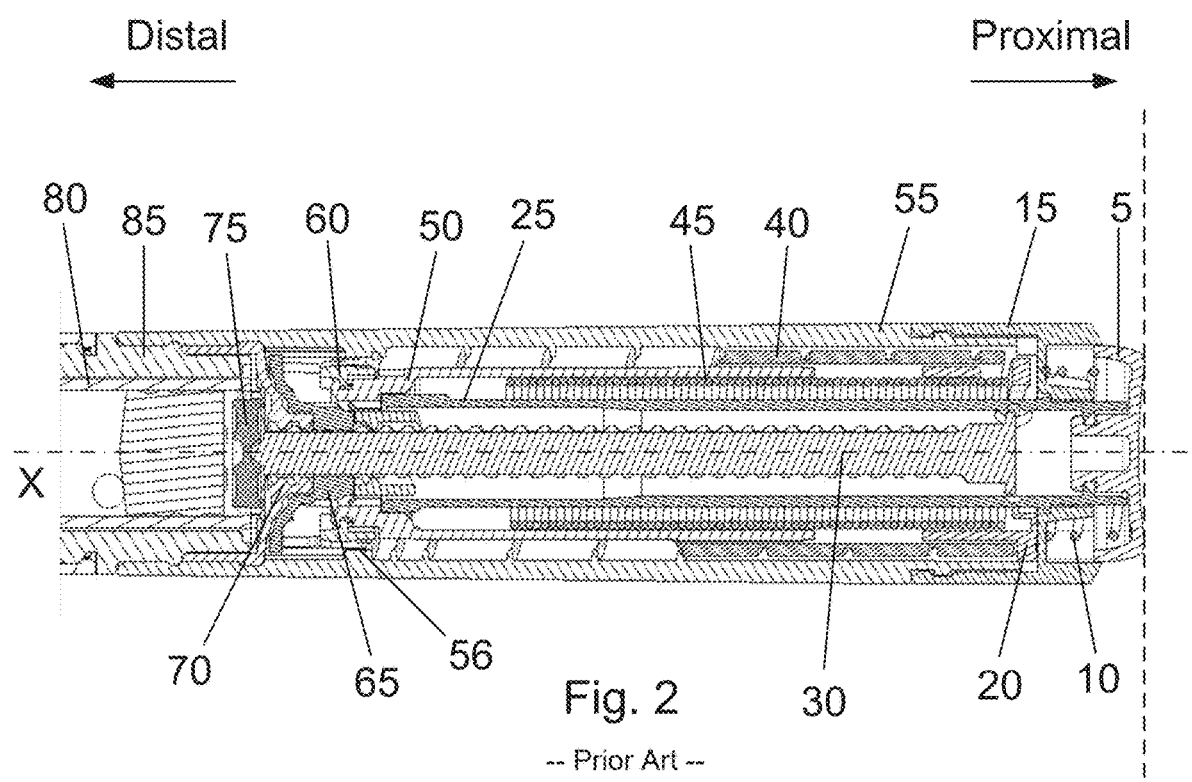
FIG. 2 show a cross-sectional view of the proximal part of the prior art torsion spring injection device of FIG. 1 during dose setting.
Figure 3:
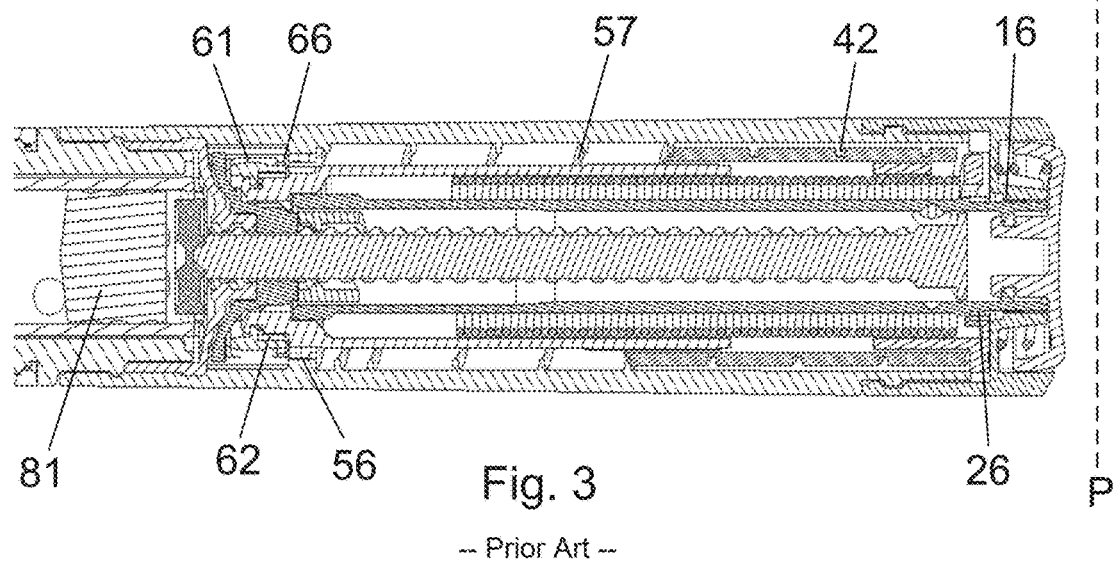
FIG. 3 show a cross-sectional view of the proximal part of the prior art torsion spring injection device of FIG. 1 during dose expelling.

FIGS. 1, 2 and 3 discloses the torsion spring driven injection device also disclosed in the FIGS. 1, 2 and 3 in WO 2020/089167. This automatic injection device is being manufactured by Novo Nordisk A/S and sold under the trade name FlexTouch®.

The following table identifies the individual parts in the prior art injection device disclosed in the FIGS. 1, 2 and 3.

| | |
|---|---|
| 5 | Injection Button |
| 10 | Return Spring |
| 15 | Dose Dial |
| 16 | Toothed Interface (26) |
| 20 | Spring Base |
| 25 | Reset Tube |
| 26 | Toothed Interface (16) |
| 27 | Axially Extending Key |
| 30 | Piston Rod |
| 31 | Longitudinal Grooves |
| 32 | Outer Thread |
| 35 | EoC counter |
| 40 | Scale drum |
| 41 | Longitudinal Recess |
| 42 | Helical Thread |
| 43 | Indicia |
| 45 | Torsion Spring |

-continued

| | |
|---|---|
| 50 | Ratchet tube |
| 51 | Flexible Arms |
| 52 | Ridges |
| 53 | Collar |
| 55 | Base Part |
| 56 | Inwardly Pointing Teeth |
| 57 | Internal Thread |
| 58 | Window |
| 59 | Toothed Periphery |
| 60 | Clutch |
| 61 | Outwardly Teeth |
| 62 | Toothed Ring |
| 65 | Piston Rod Driver |
| 66 | Teeth |
| 67 | One-way Arms |
| 68 | Ridges |
| 70 | Nut part |
| 71 | Inner Thread |
| 75 | Piston Washer |
| 80 | Cartridge |
| 81 | Plunger |
| 85 | Cartridge Holder |

The dose setting- and injection mechanism is built in a housing structure which basically comprises the base part 55 and the cartridge holder 85. The cartridge 80 containing the liquid drug is secured in the cartridge holder 85 which is locked by the nut part 70. Proximally the base part 55 is closed by the spring base 20. Together these four parts; spring base 20, base part 55, nut part 70 and cartridge holder 85 makes up the housing structure in the disclosed example. The housing structure could alternatively be made from other parts which could be connected in many different ways. It would also be possible to make the housing structure from a different number of parts or even to mould the housing structure as one unit.

The torsion spring 45 disclosed is a helical coiled metallic spring which is encompassed between the spring base 20, which is an inrotatable part of the housing structure, and the rotatable ratchet tube 50. When the ratchet tube 50 is rotated relatively to the housing structure a torque is thus built and stored in the torsion spring 45.

Dose Setting

Dose setting is disclosed in FIG. 2. Whenever the user wants to set the size of the dose of liquid drug to be ejected, the user rotates the dose dial 15. The dose dial 15 is rotationally coupled to the reset tube 25 by a toothed interface 16, 26 (see e.g. FIG. 1) such that the dose dial 15 and the reset tube 25 rotates together during dose setting.

The reset tube 25 is further rotationally coupled to the ratchet tube 50 which thus also rotates together with the dose dial 15 and the reset tube 25 during dose setting. The coupling between the ratchet tube 50 and the reset tube 25 is preferably such that the two parts 25, 50 are axially locked to each other but able to rotate a few degrees relatively to each other for lowering a set dose as will be explained. However, the two parts 25, 50 could alternatively be moulded as one unitary part in which case it would not be possible to regret and lower a set dose.

As seen in the FIGS. 1 to 3, the clutch 60 is on the outer surface provided with a number of outwardly pointing teeth 61 which during dose setting (FIG. 2) is engaged by similar teeth 56 provided inside the base part 55 of the housing structure such that the clutch 60 is kept inrotatable during dose setting.

Axially the clutch 60 is click-fitted onto a collar 53 provided on the ratchet tube 50 such that the ratchet tube 50 and the clutch 60 moves together axially. However, this click-fit is designed such that the clutch 60 is rotatable in relation the clutch 60.

Internally the clutch 60 is provided with a toothed ring 62 which is engaged by a flexible arm 51 provided distally on the ratchet tube 50 (any number of flexible arms 51 can be provided). This engagement allows the ratchet tube 50 to rotate in one direction only (in relation to the clutch 60 which is anchored in the housing structure during dose setting). In the attached drawings this allowed direction is the counter-clockwise direction (when the injection device is viewed from the distal face) however this is only in the given example and could be the opposite direction if wanted. The allowed direction indicated by the arrow "A" in FIG. 1 is the direction that strains the torsion spring 45 which is encompassed between the spring base 20 and the ratchet tube 50. A torque is thus stored in the torsion spring 45 during rotation of the dose dial 15 and the engagement between the flexible arm 51 on the ratchet tube 50 and the toothed ring 62 inside the clutch 62 prevents this torque from being released.

The spring base 20 is inrotatable secured to the base part 55 of the housing structure such that the torsion spring 20 is strained when the ratchet tube 50 is rotated in the counter-clockwise direction.

The ratchet tube 50 is on the outer surface provided with ridges 52 which engage corresponding longitudinal recesses 41 provided on the inner surface of the scale drum 40. This interface forces the scale drum 40 to rotate together with the ratchet tube 50 at all times.

The scale drum 40 is further provided with a helical thread 42 on the outer surface which engages an internal thread 57 inside the base part 55 of the housing structure such that the scale drum 40 move helically when rotated. This helical movement of the scale drum 40 brings the indicia 43 printed in a helical pattern into the range of the window 58 in the base part 55 such that the user can visually follow the dose setting.

Should the user by accident set a dose size higher than what is actually required it is possible to lower the set dose by rotating the dose dial 15 in the opposite direction as explained below.

Dose Lowering

When the user regrets a set dose and wants to lower a set dose, the user rotates the dose dial 15 in the clock-wise direction (also when viewed from the distal face) which rotation is transformed to a rotation of the reset tube 25 also in the clock-wise direction.

The reset tube 25 is coupled to the ratchet tube 50 such that these two elements 25, 50 are axially locked to each other but able to rotate a few degrees relatively to each other.

However, the ratchet tube 50 is engaged with the clutch 60 through the flexible arm 51 engaging the toothed ring 62 of the clutch 60, and the clutch 60 is rotationally secured in the housing structure by the interface between the outwardly teeth 61 and inwardly pointing teeth 56 in the base part 55 of the housing structure. The ratchet tube 50 is thus not immediately rotatable in the direction lowering the set dose.

Distally the reset tube 25 is provided with an axially extending key 27 which engages on the outside of the flexible arm 51 which flexible arm 15 is pressed toward the centre line X when the reset tube 25 is rotated clock-wise a few degrees relatively to the ratchet tube 50 to thereby lower the set does. This dial-down mechanism is described in more details in e.g. U.S. Pat. No. 9,132,239.

The impact by the key 27 on the flexible arm 51 thus forces the flexible arm 51 out of engagement with the clutch 60 such that the torque of the torsion spring 80 is able to rotate the ratchet tube 50 in the clock-wise direction. Since the rotational speed of the ratchet tube 50 when impacted by the torque of the torsion spring 45 is higher than the rotational speed of the reset tube 25 operated by the user, the flexible arm 51 re-engages the first previous teeth in the toothed ring 62. It is thus possible to lower the set dose size incrementally by rotating the dose dial 15 in a direction opposite to the direction used when setting a dose (i.e. the clock-wise direction in the example).

Both during dose setting and when regretting the set dose, the scale drum 40 rotates helically forced by the engagement with the ratchet tube 50 such that the user at any time can inspect the resulting set dose in the window 58.

Once the correct dose has been reached, the user inserts the pen needle through the skin and injects the set dose.

Injecting

The injection is performed by pushing the injection button 5 a distance in the distal direction against the bias of the return spring 10 which distance is indicated by the dashed line "P" in FIG. 2 and FIG. 3.

The injection button 5 is click-fitted to the reset tube 25 as disclosed in FIG. 3 which show the situation during injection. The injection button 5 thus also moves the reset tube 25 in the distal direction.

As further seen in FIG. 3, the ratchet tube 50 is axially coupled to the reset tube 25 and the clutch 60 is coupled to the ratchet tube 50. The result being that both the ratchet tube 50 and the clutch 60 is moved in the distal direction when the injection button 5 and the reset tube 25 are pushed distally by the user.

The distal movement of the clutch 60 disengages the outwardly pointing teeth 61 on the clutch 60 from the teeth 56 inside the base part 55 of the housing structure as seen in FIG. 3. Consequently, there is nothing holding the torque stored in the torsion spring 45 when the injection button 5 is pushed distally. The torque of the torsion spring 45 consequently rotates the ratchet tube 50 and the flexible arm 51 provided on the ratchet tube 50 transfers this rotation to a rotation of the clutch 60. The reset tube 25 also rotates together with the ratchet tube 50. This rotation occurs in the disclosed example in the clock-wise direction.

As seen in FIG. 1 the reset tube 25 engages the dose dial 15 with a toothed engagement 16, 26 such that when the reset tube 25 is moved distally this engagement disengages such that the dose dial 15 do not follow the rotation of the reset tube 25 during injection.

However, the scale drum 40 is constantly engaged with the ratchet tube 50 such that the scale drum 40 rotates helically back to its initial position when the ratchet tube 50 rotates during injection. Both FIG. 2 and FIG. 3 depicts the scale drum 40 in the "zero" position. During dose setting the scale drum 40 moves helically in the distal direction.

When the ratchet tube 50 together with the clutch 60 are moved distally out of engagement with the base part 55 of the housing structure, the outwardly teeth 61 provided on the clutch 60 are moved axially into engagement with corresponding teeth 66 provided on the piston rod driver 65.

The torque of the torsion spring 45 is thus transferred to a rotation of the piston rod driver 65 which is further provided with one or more one-way arms 67 engaging a toothed periphery 59 inside the base part 55 of the housing structure only allowing rotation of the piston rod driver 65 in one rotational direction (clock-wise in the disclosed example when viewed from the distal face).

Internally the piston rod driver 65 is provided with one or more inwardly pointing ridges 68 engaging longitudinal grooves 31 in the piston rod 30 such that the piston rod 30 is forced to rotate with the piston rod driver 65 during injection.

The rotation of the ratchet tube 50, the scale drum 40, the clutch 60 and the reset tube 25 under the force of the torque of the torsion spring 45 and the resulting rotation of the piston rod 30 rotates the piston rod 30 helically in the distal direction due to the engagement between the thread 71 of the nut part 70 and the thread 32 of the piston rod 30.

Distally the piston rod 30 pushes on a piston rod foot 75 which transfers the forward movement of the piston rod 30 to a forward movement of the plunger 81 inside the cartridge 80 which again forces a volume of the liquid drug out through the lumen of the pen needle.

As best seen in FIG. 1 the scale drum 40 carries a number of indicia 43 printed in a helical row on the outer surface. These indicia 43 pass by the window 58 in the housing structure both during dose setting, during dose lowering and during injection. Any random number of indicia 43 can be provided and in the example disclosed in FIG. 1 these indicia 43 are Arabian number in the range from 0 to 80. Typically, these numbers indicate some kind of units related to the liquid drug contained in the cartridge 80, but obviously any kind of indicia can be used.

The scale drum 40 is fixed to the ratchet tube 50 in the longitudinal direction and threaded to the base part 55 of the housing structure such that the scale drum 40 move helically when the ratchet tube 50 is rotated as explained. When the dose intended to be ejected has been reached the user pushes the injection button 5 in the distal direction to thereby eject the set dose. The injection button 5 together with the reset tube 25 and the ratchet tube 50 are movable in the distal direction for any given dose size in the example disclosed in FIG. 1 to 3.

Further, an End-of-Content and safety nut 35 is provided, the use of which is explained in EP 1,869,870 and in EP 1,869,871.

EXAMPLES

The invention relates to a mechanism for releasing the piston rod when changing the cartridge in an injection device. In the following, this release mechanism is disclosed in context with the above described FlexTouch®, however, the release mechanism is not bound for this particular injection device but can be used with any kind of related injection device.

By incorporating the release mechanism as herein described to an injection device as the FlexTouch®, which is a torsion spring driven pre-filled injection device, the resulting injection device can be used several times since the cartridge can be exchanged. The injection device according to the invention is thus a durable injection device.

First Example of the Invention

The individual physical elements in the following example being either the same as in the injection device disclosed in FIG. 1 to 3 or similar are referenced by the same reference number with a "1" in front. The piston rod is thus in the following example in FIG. 4 to 12 provided with the reference "130".

Figure 4:
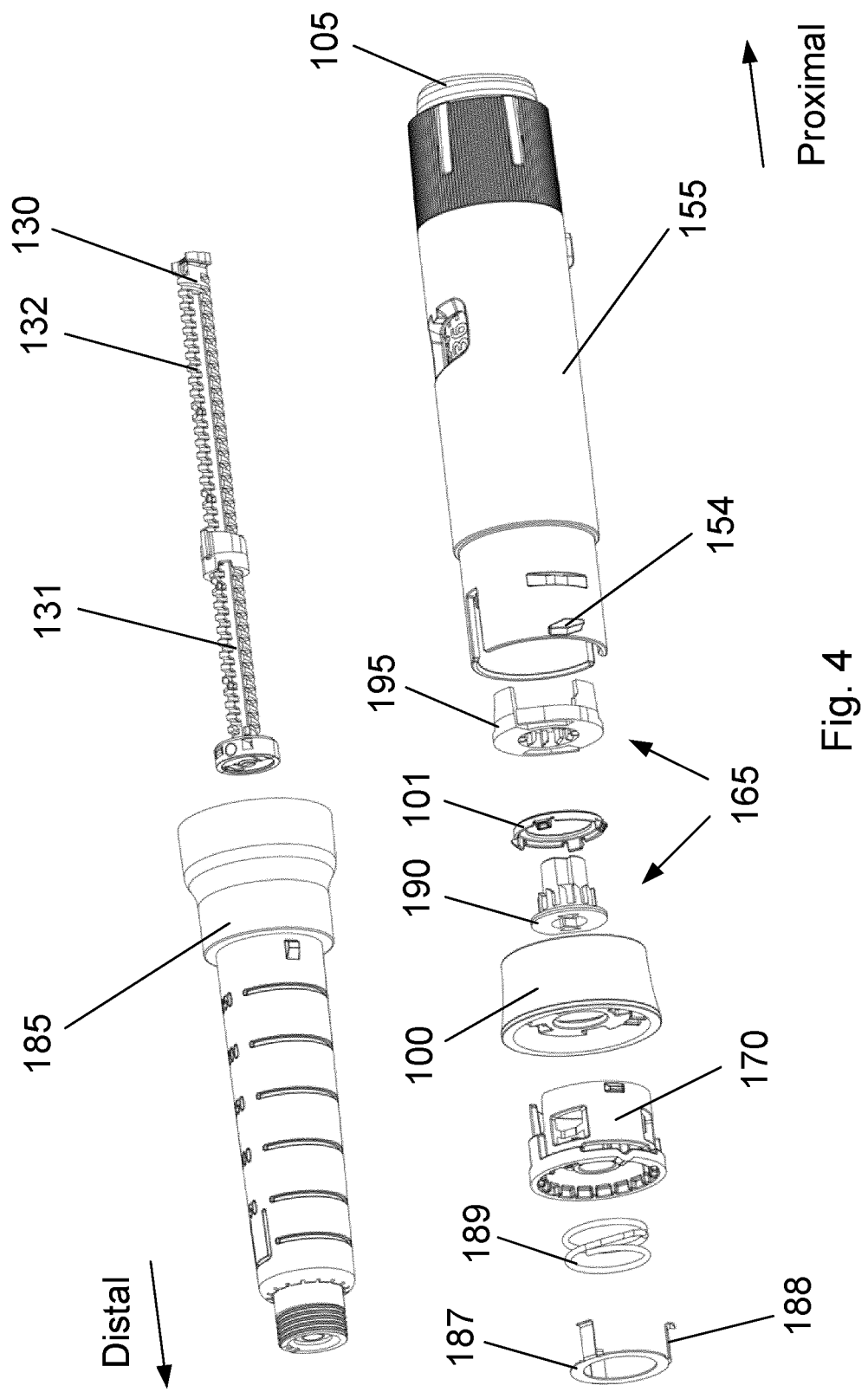
FIG. 4 show an exploded view of a first example of the injection device according to the invention.
Figure 5:
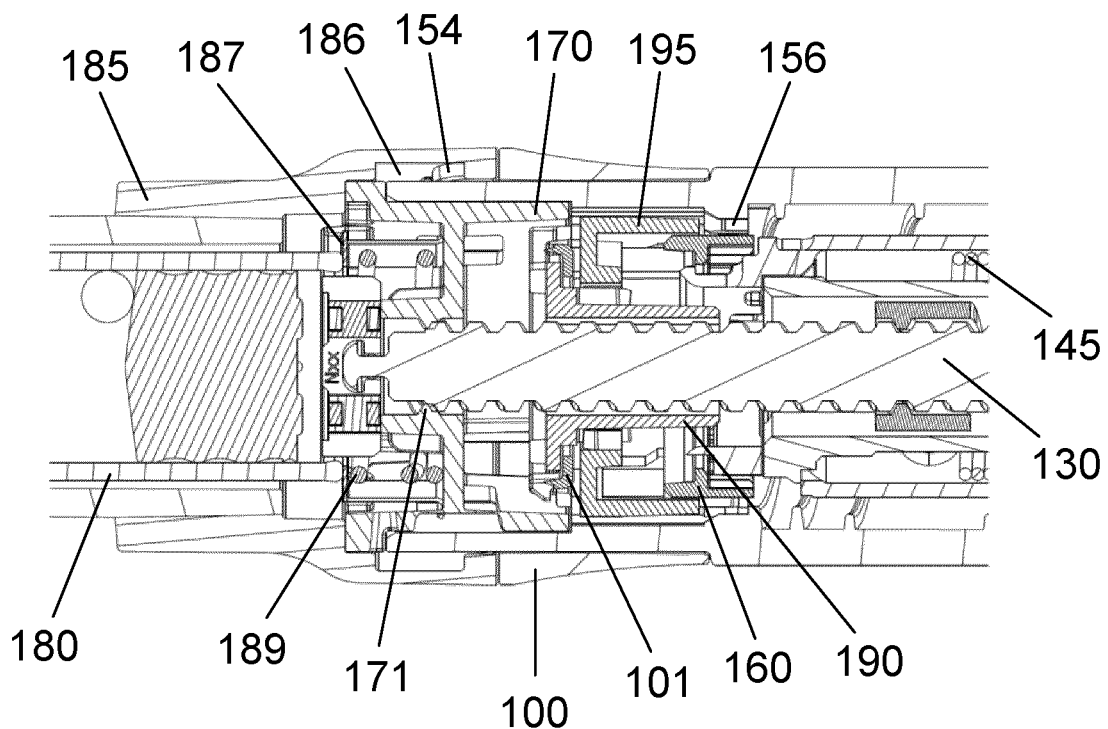
FIG. 5 show a cross-sectional view of the first example with the cartridge holder attached to the injection device.

The piston rod 130 as e.g. seen in FIG. 4 and FIG. 5 is provided with a longitudinal track structure 131 and an outer thread 132. A well-known End-of-Content nut is helically guided by the outer thread 132.

The housing structure comprises a base part 155, a cartridge holder part 185 and a nut element 170. The base part 155 is provided with one or more guiding protrusion 154 which engages an internal track 186 provided inside the cartridge holder part 185 such that they together form a bayonet coupling, however other kinds of connections can be used to connect the cartridge holder part 185.

The nut element 170 is irreversible connected to the base part 155 of the housing by a click-fit interface or alternatively moulded as an integral part of the base part 155 of the housing structure. The nut element 170 is on an inner surface provided with an inner thread 171 which mates the outer thread 132 of the piston rod 130 such that a rotation of the piston rod 130 transports the piston rod 130 helically in the axial direction.

The nut element 170 further holds a clip 187 e.g. made from metal, which in the disclosed example is provided with three proximally pointing legs 188 which engages the nut element 170 such that the clip 187 is able to move axially without disengaging the nut element 170. The clip 187 is urged in the distal direction by a compression spring 189 which is encompassed between the nut element 170 and the metal clip 187. The purpose of this clip 187 is to push the cartridge 180 in the distal direction such that the shoulder of the cartridge 180 abuts the cartridge holder 185 at its distal end.

The expelling mechanism comprises a torsion spring 145 as e.g. disclosed in FIG. 5 which during dose expelling rotates a piston rod driver 165. As also disclosed in the prior art example the clutch 160 can be moved in the distal direction and out of engagement with the teeth 156 inside the housing part 155 when the user pushes the injection button 105.

Figure 11:
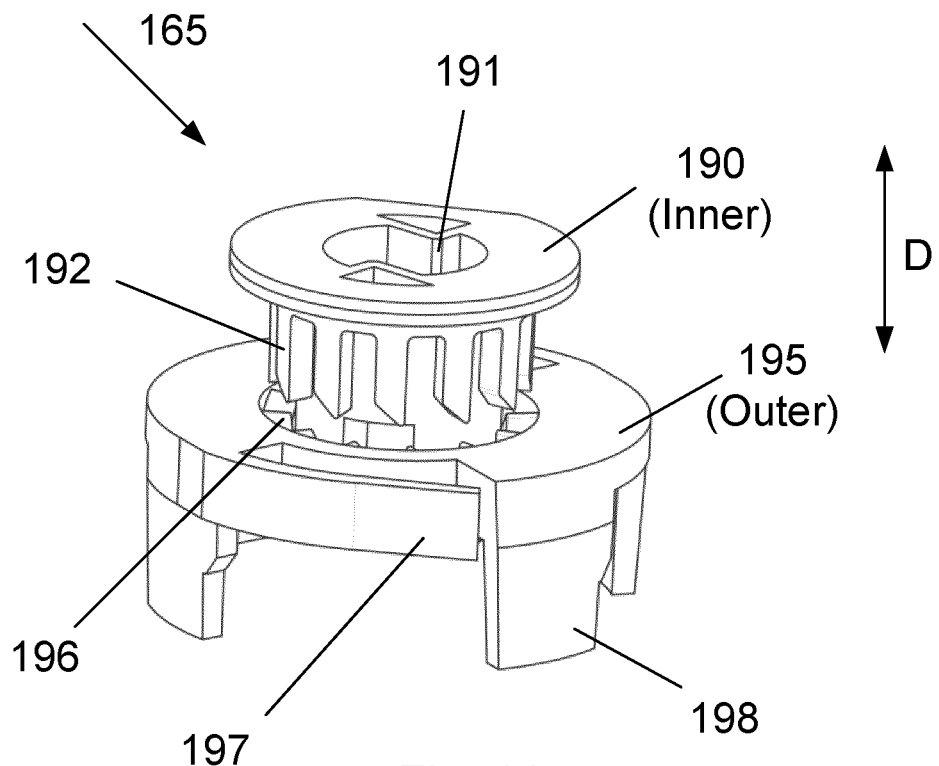
FIG. 11 show the piston rod driver in the disengaged state with the inner element uncoupled from the outer element i.e. the first position.
Figure 12:
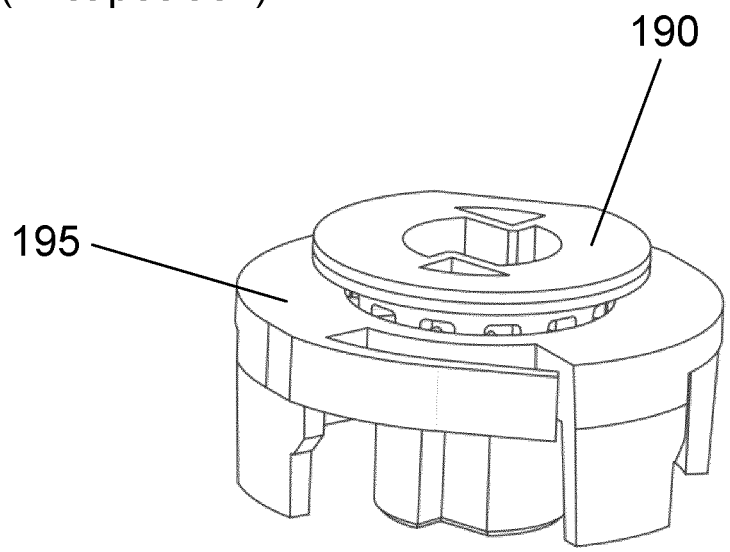
FIG. 12 show the piston rod driver in the engaged state with the inner element and the outer element coupled together i.e. the second position.

The piston rod driver 165 is made up from two elements as disclosed in FIG. 11 and FIG. 12; an inner element 190 engaging the piston rod 130 and an outer element 195 being engaged by the clutch 160 at least during dose expelling.

The inner element 190 is internally provided with one or more inwardly pointing ridges 191 which engages the longitudinal track 131 provided in the piston rod 130 such that a rotation of the inner element 190 is transferred to a similar rotation of the piston rod 130. The inner element 190 is further on its outer surface provided with a plurality of outwardly pointing teeth 192.

These teeth 192 mates with similar inwardly pointing teeth 196 provided internally in the outer element 195. The outer element 195 further comprises any number of radial click-arms 197 and a number of axial extension arms 198.

The radial click-arms 197 rides on an internal toothing provided in the base part 155 of the housing structure such that a distinct sound is made when the outer element 195 is rotated.

The engagement with the base part 155 of the housing structure is preferably formed such that outer element 195 can only rotate in one rotational direction in relation to the housing structure. The allowed direction being the one which moves the piston rod 130 towards the distal end of the housing structure.

The outer element 195 is preferably secured in its axial position by the nut element 170 such that the outer element 195 cannot move axially but only rotate.

The axial extension arms 198 engages the spring drive mechanism during dose expelling as known from the prior art example such that a torque can be transmitted from the torsion spring 145 to a rotation of the outer element 195 of the piston rod driver 165 during dose delivery. As in the prior art example, the outer element 195 engages the clutch 160 of the spring drive mechanism at least during dose expelling such that the outwardly pointing teeth 161 provided on the clutch 160 drives the axial extension arms 198 on the outer element 195.

The inner element 190 is further able to move translational in and out of engagement with the outer element 195 as illustrated by the arrow "D" in FIG. 11.

In the first position, when the inner element 190 is uncoupled from the outer element 195 as disclosed in FIG. 11, the inner element 190 is free to rotate independently of the outer element 195.

In the second position, when the inner element 190 is coupled to the outer element 195 as disclosed in FIG. 12, the inner element 190 will follow any rotation of the outer element 195 such that rotation of the outer element 195 will be transmitted to a similar rotation of the piston rod 130.

The nut element 170 which is irreversible secured to the housing structure is surrounded by a movable sleeve 100. This movable sleeve 100 is able to slide axially along the housing structure without rotating. To accommodate the axial movement, both the base part 155 of the housing structure and the nut element 170 are provided with one or more longitudinal slits or openings.

On an inner surface the movable sleeve 100 carries a ring element 101 which is click-fitted to the movable sleeve 100 and thus follows the axial movement of the sleeve 100.

As best seen in FIG. 5, this ring element 101 engages the inner element 190 of the piston rod driver 165 such that the inner element 190 moves axially together with the movable sleeve 100.

Figure 7:
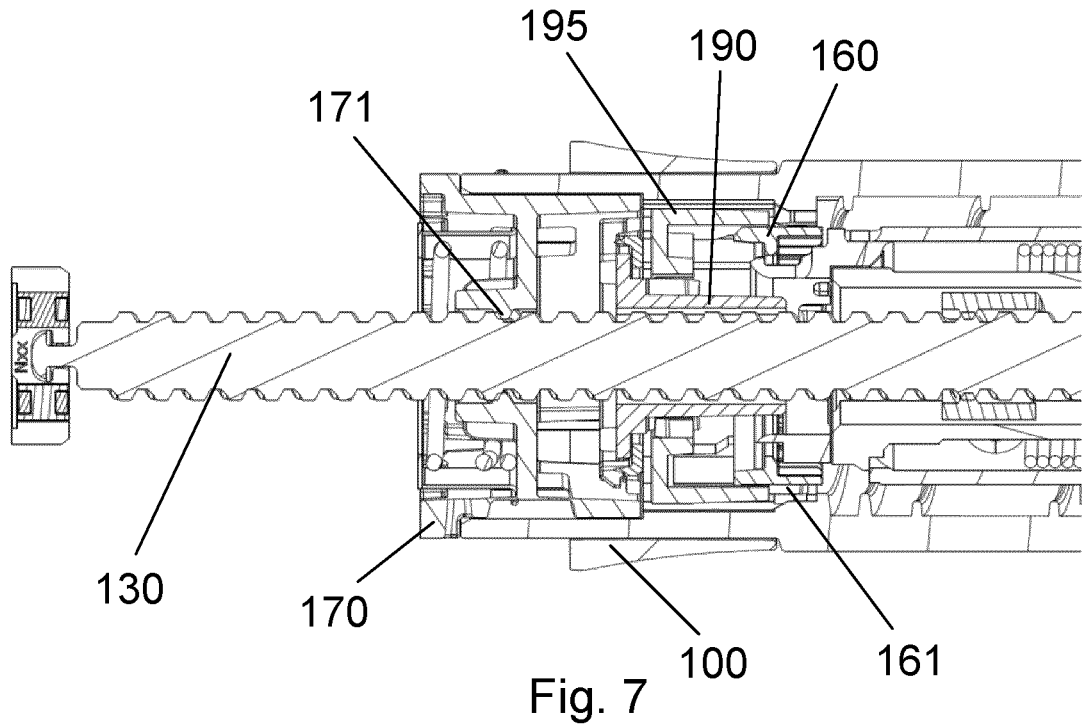
FIG. 7 show a cross-sectional view of the first example with the release mechanism in the second locked position and the piston rod extended.

FIG. 7 discloses the situation in which the piston rod 130 has been moved to a certain position and the user wants to change the cartridge 180. In FIG. 7, the cartridge 180 and the cartridge holder part 145 has been removed, however the inner element 190 is still coupled to the outer element 195 as in FIG. 12.

Figure 8:
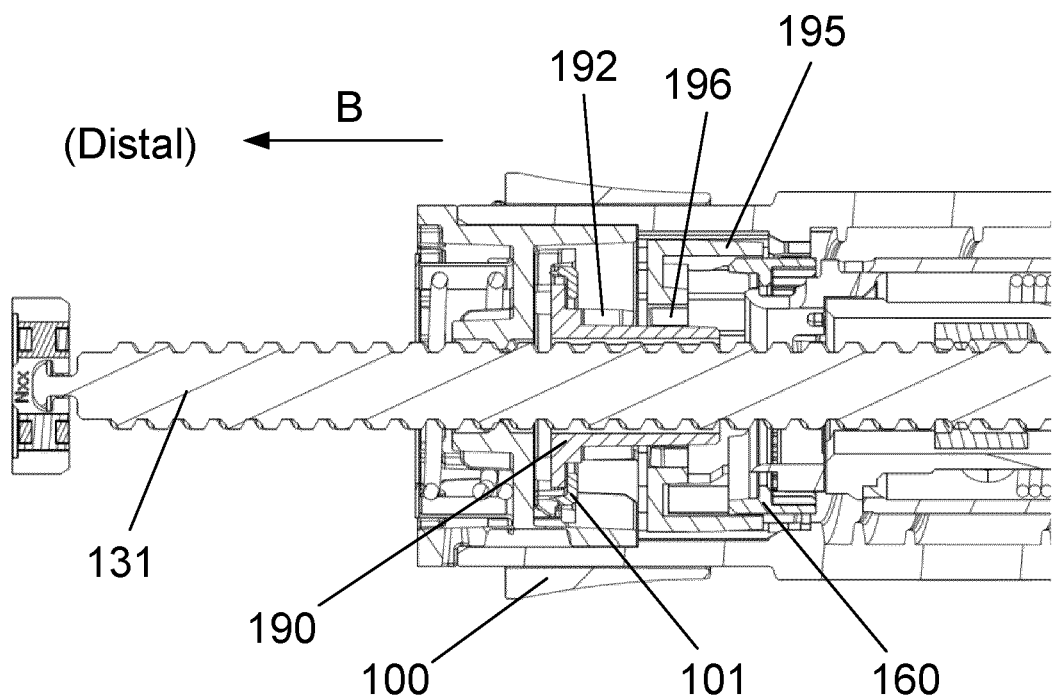
FIG. 8 show a cross-sectional view of the first example with the release mechanism in the first unlocked position and the piston rod extended.

In FIG. 8, the user has moved the movable sleeve 100 in the distal direction as indicated by the arrow "B". Since the movable sleeve 100 connects to the ring element 101 this element has also been moved in the distal direction. As the movable sleeve 100 and the ring element 101 moves they pull along the inner element 190 in the distal direction such that the inner element 190 uncouples from the outer element 195.

Once the inner element 190 and the outer element 195 has been uncoupled as disclosed in FIG. 8 (and in FIG. 11), the inner element 190 can rotate freely. By uncoupled is here meant that the teeth 192 on the inner element 190 has been moved out of engagement with the inwardly pointing teeth 196 on the outer element 195. The user is thus able to rotate the piston rod 130 back in the thread 171 in the nut member 170 as the inner element 190 now follows the rotation of the piston rod 130.

Figure 9:
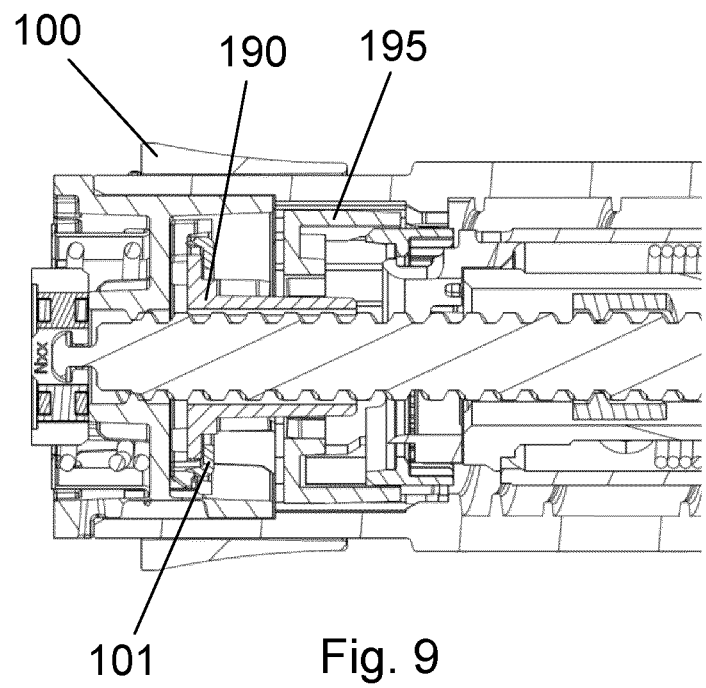
FIG. 9 show a cross-sectional view of the first example with the release mechanism in the first unlocked position and the piston rod retracted.

Once the piston rod 130 has been rotated back to its initiate position as disclosed in FIG. 9, the user can move the movable sleeve 100 in the proximal direction to thereby move the inner element 190 proximally. Since the inner element 190 is guided in the longitudinal track 131 in the piston rod 130, the inner element 190 can move translationally without influencing the rotational position of the piston rod 130.

Figure 10:
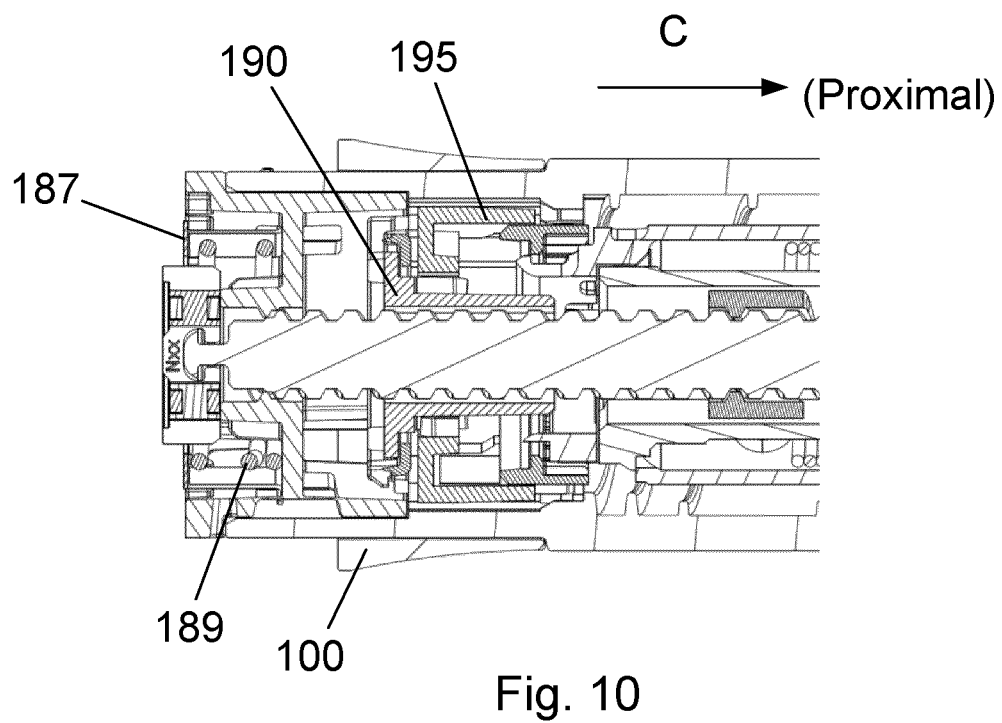
FIG. 10 show a cross-sectional view of the first example with the release mechanism in the second locked position and the piston rod retracted.

In FIG. 10, the movable sleeve 100 has been moved back into the second position wherein the inner element 190 is again coupled to the outer element 195 to follow rotation of the outer element 195. This is indicated by the arrow "C" in FIG. 10.

In this second position the clutch 160 when rotated by the torsion spring 145 rotates the outer element 195 which again rotates the inner element 190 and henceforth also the piston rod 130.

Should the user for some reason not move the movable sleeve 100 in the proximal direction indicated in FIG. 10 this will automatically happen when the user mounts the cartridge holder 185 onto the base part 155 of the housing structure. As best seen in FIG. 5, the cartridge holder part 185 abuts the movable sleeve 100 and forces the movable sleeve 100 to its proximal position when mounted.

Figure 6:
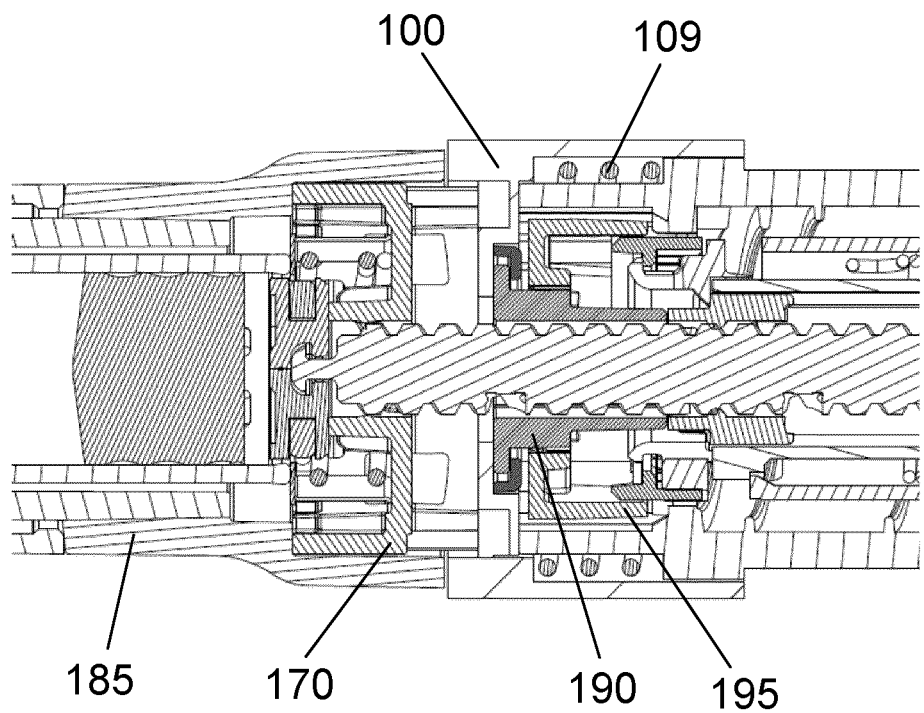
FIG. 6 show a cross-sectional view of the first example with the cartridge holder attached to the injection device and with a release spring incorporated.

In a further example disclosed in FIG. 6, a compression spring 109 can be provided between the base part 155 of the housing structure and the movable 100 sleeve such that the movable sleeve 100 is automatically moved in the distal direction when the user removes the cartridge holder part 185.

Second Example of the Invention

The individual physical elements in this example being either the same as in the injection device previously disclosed or having a similar function are referenced by the same reference number with an "2" in front. The piston rod is thus in the following example in FIG. 13 to 16 provided with the reference "230".

As seen in FIG. 13A-B, the piston rod 230 is provided with an outer thread 132 and a longitudinal track structure 231.

The rotatable piston rod driver 265 is divided into an inner part 290 engaging the track structure 231 of the piston rod 230 and an outer part 295 engaging the drive mechanism at least during dose expelling.

The housing structure also in this example comprises a nut member 270 which is irreversible connected to the base part by a click-fit engagement. The nut member 270 is internally provided with a thread 271 engaging the outer thread 232 of the piston rod 230.

The nut member 270 is in this example provided with an internal track 272 which is able to engage with an outwardly pointing protrusion 284 provided on the cartridge holder part 280. The engagement between the nut member 270 and the cartridge holder part 280 is preferably a bayonet coupling. In the disclosed example two such tracks 272 and two protrusions 284 are shown, however any number can be present.

A compression spring 289 is encompassed between the nut member 270 and a sleeve element 287 such that the sleeve element 287 is urged in the distal direction. The sleeve element 287 has an outwardly pointing flange 287a and an inwardly pointing flange 287b (see FIG. 16). The outwardly pointing flange 287a is engaged by the compression spring 289 and the inwardly pointing flange 287b engages the release element 200.

The release element 200 which is disclosed in an enlarged version in FIG. 13C is proximally provided with a flange 201 which connects the release element 200 to the inner element 290 such that the release element 200 and the inner element 290 moves together in the axial direction.

The release element 200 further comprises a set of outer arms 202 and a set of inner arms 203. The outer arms 202 distally terminates in a sloped surface 206 and the inner arms 203 distally terminates in hooks 204. These arms 202, 203 are preferably provided as a pair, but other numbers could be envisaged.

As also seen in FIG. 13C, the inner element 290 is provided with a ring of outwardly pointing teeth 292 and the outer element 295 is provided with a similar ring of inwardly pointing teeth 296.

In a first position similar to the disclosure of FIG. 11, the inner element 290 is decoupled from the outer element 295 such that the inner element 290 can rotate freely and in a second position corresponding to FIG. 12, the inner element 290 is coupled to the outer element 295 such that they rotate together. This engagement is preferably obtained by an engagement between the teeth 292 on the inner element 290 and the teeth 296 on the outer element 295.

Figure 14:
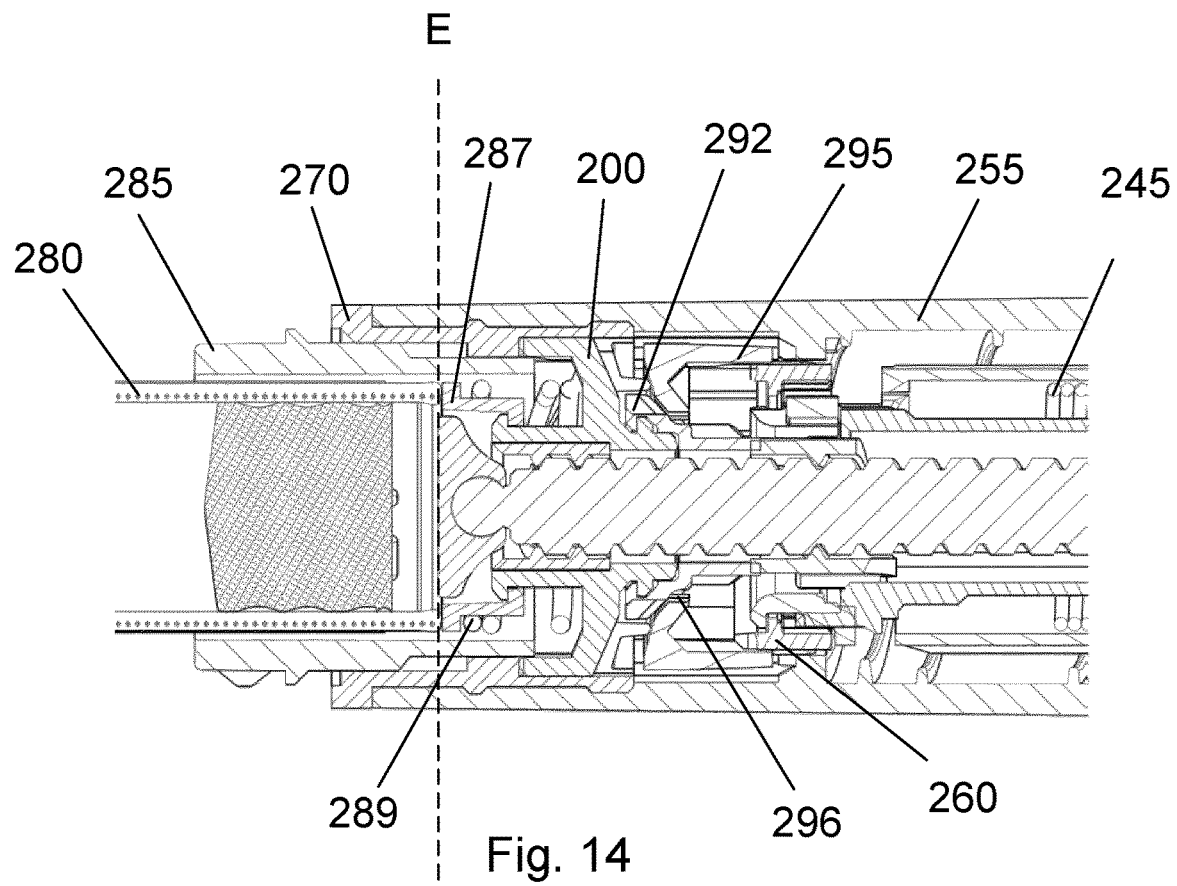
FIG. 14 show a cross-sectional view of the second example with the release mechanism in the first unlocked position.

FIG. 14 disclose the state wherein the user has inserted a new cartridge 280 into the cartridge holder part 285 and has started to connect the cartridge holder part 285 to the base part 255 of the housing structure. In this state, the outwardly pointing protrusion 284 is aligned with the start of the internal track 272 in the nut member 270.

In this state when the cartridge holder part 285 has not yet been attached, the compression spring 289 urges the sleeve element 287 in the distal direction. The sleeve element 287 is clicked onto the hooks 204 of the release element 200 such that the release element 200 is also pulled in the distal direction.

Since the release element 200 is connected to the inner element 290 by the flange 201, the inner element 290 is pulled out of its engagement with the outer element 295 in this state.

Henceforth, when the cartridge holder part 285 is not attached, the compression spring 289 pulls the inner element 290 distally into the first position wherein the inner element 290 is free to rotate.

Figure 15:
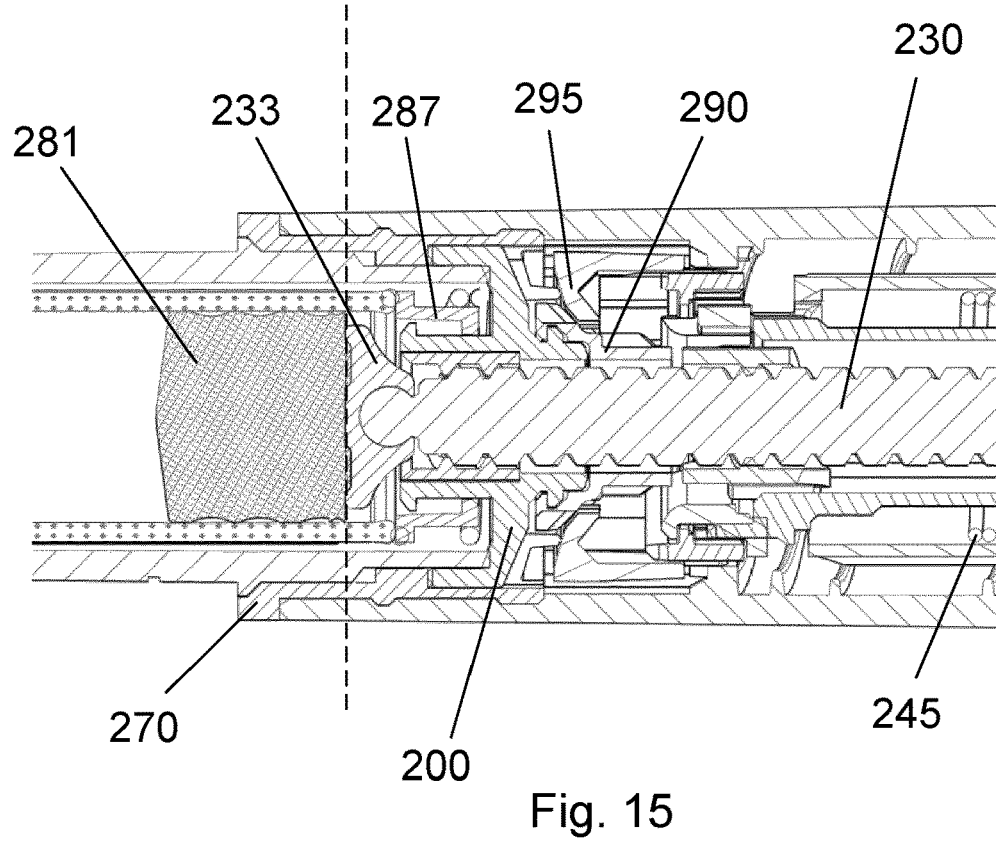
FIG. 15 show a cross-sectional view of the second example with the release mechanism in the first unlocked position and contact between the plunger and the piston rod foot.

When the user starts to rotate the cartridge holder part 285 in the bayonet coupling such that the outwardly pointing protrusion 284 slides into the track 272, the sleeve element 287 is forced to move in the proximal direction as disclosed in FIG. 15 as the cartridge 280 is pulled in the proximal direction and the proximal end of the cartridge 280 abut the distal end of the sleeve 287. However, no force is applied onto the release element 200 in this state as the sleeve 287 slides on the inner arms 203 of the release element 200. The release element 200 thus remains in its position and since the release element 200 do not move neither does the inner element 290. Due to this it is possible to obtain a proper connection between the plunger 281 inside the cartridge 280 and the piston rod 230, which in the disclosed examples is provided with a piston rod foot 233, before the release mechanism actually locks the inner part 290 to the outer part 295. The punctured line "E" in FIG. 14 and FIG. 15 indicates the abutment between the plunger 281 and the piston rod foot 233.

The track 272 in the nut member 270 terminates in a more straight path and when the outwardly pointing protrusion 284 enters into this straight path, the protrusion 284 abut the sloped surface 206 on the release element 200. The continued rotation of the outwardly pointing protrusion 284 in the straight path forces the release element 200 to move in the proximal direction due to the increasing force applied to the sloped surface 206.

Figure 16:
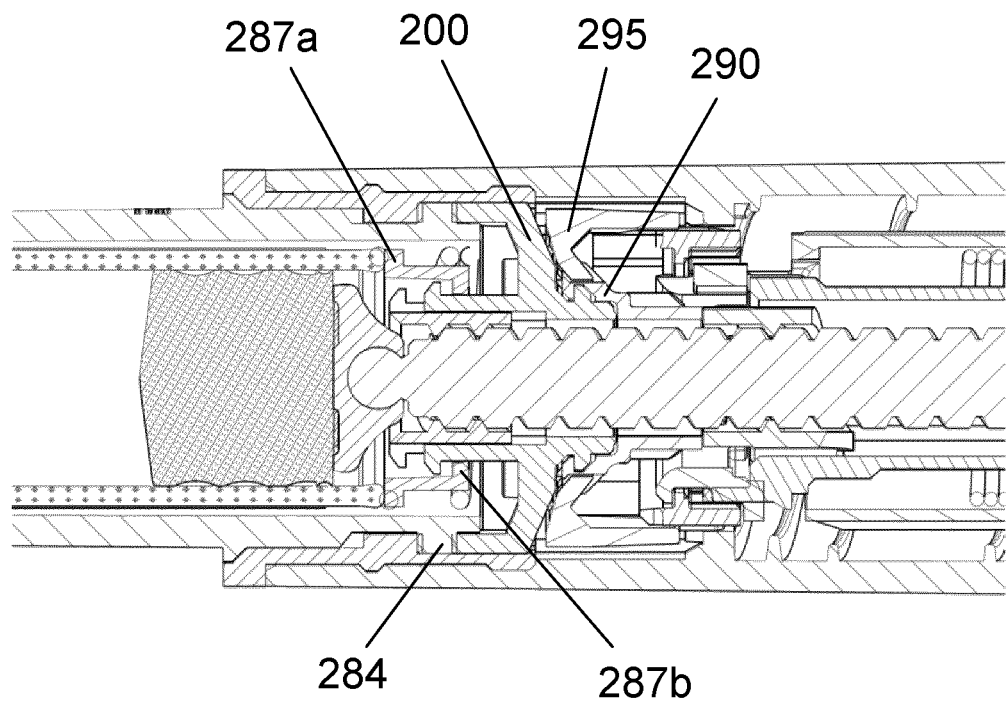
FIG. 16 show a cross-sectional view of the second example with the release mechanism in the second locked position.

As seen in the state in FIG. 16, the proximal movement of the release element 200 in the proximal direction is transmitted to a similar movement of the inner element 290 in the proximal direction. The result of this movement of the inner element 290 is hence that the teeth 292 on the inner element 290 engages with the teeth 296 on the outer element 295 and the inner element 290 is thus locked to the outer element 295.

It is henceforth the contact between the outwardly pointing protrusion 284 and the sloped surface 206 that locks the inner element 290 to the outer element 295 and not the actual position of the plunger 281 and the piston rod foot 233.

Whenever an injection is performed hereafter, the clutch 260 rotated by the torsion spring 245 rotates the outer element 295 and hence the inner element 290 which again rotates the piston rod 230.

Third Example of the Invention

Figure 18:
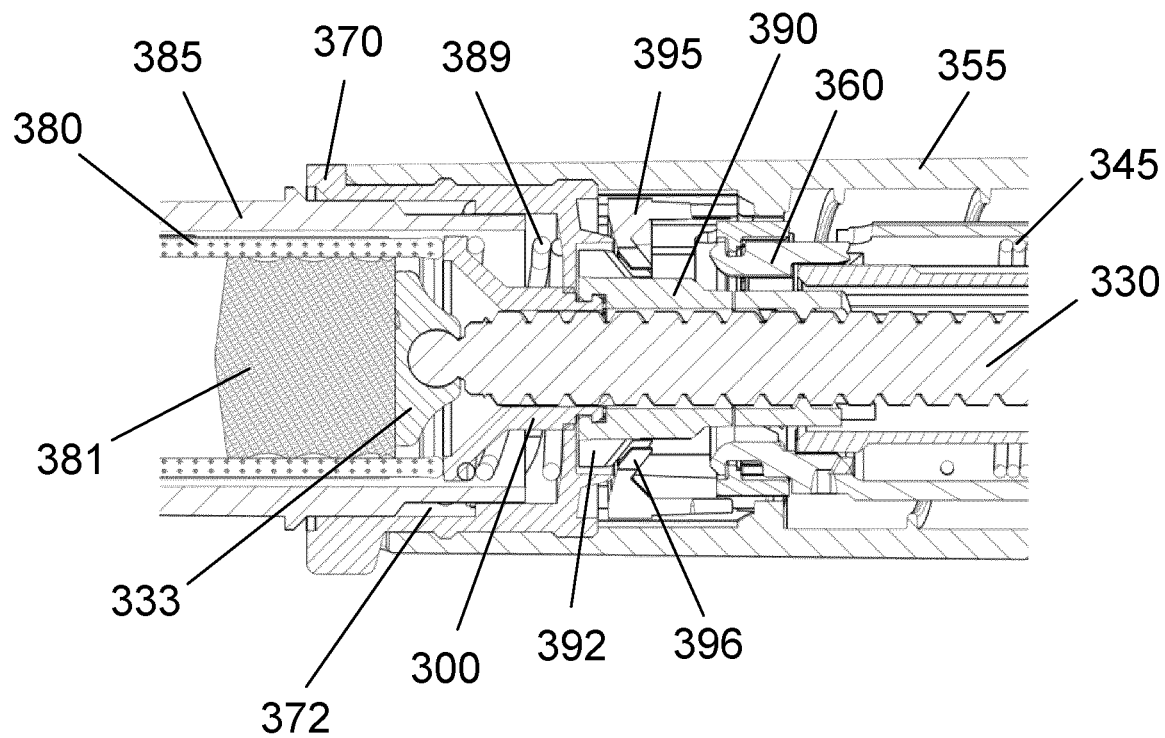
FIG. 18 show a cross-sectional view of the third example with the release mechanism in the first unlocked position.
Figure 19:
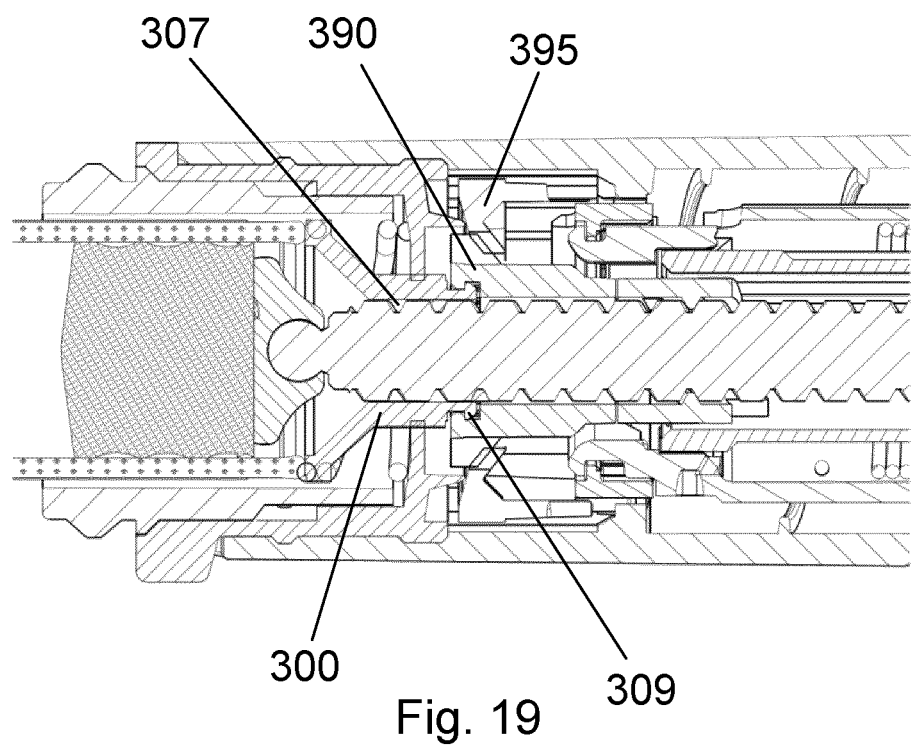
FIG. 19 show a cross-sectional view of the third example with the release mechanism in the second locked position.

The individual physical elements in this example being either the same as in the injection device previously disclosed or having a similar function are referenced by the same reference number with a "3" in front. The piston rod is thus in the following example in FIG. 17 to 19 provided with the reference "330".

As seen in FIG. 17A-B, the piston rod 330 is provided with an outer thread 332 and a longitudinal track structure 331.

The rotatable piston rod driver 365 is divided into an inner part 390 engaging the track structure 331 of the piston rod 330 and an outer part 395 engaging the drive mechanism at least during dose expelling.

The housing structure also in this example comprises a nut member 370 which is irreversible connected to the base part 355 by a click-fit engagement. The nut member 370 is internally provided with an insert 300 which carries the thread 307 engaging the outer thread 332 of the piston rod 330.

The nut member 370 is in this example provided with an internal track 372 which is able to engage with an outwardly pointing protrusion 384 provided on the cartridge holder part 380. The engagement between the nut member 370 and the cartridge holder part 380 is preferably a bayonet coupling. In the disclosed example two such tracks 372 and two protrusions 384 are shown, however any number can be present.

A compression spring 389 is encompassed between the nut member 370 and the insert 300 such that the insert 300 is urged in the distal direction. The insert 300 has an outwardly pointing flange 308 which lies against the compression spring 389. Proximally, the insert 300 is provided with a second flange 309 which rotatable connect the insert 300 to the inner element 390 such that the insert 300 and the inner element 390 move together in the axial direction but are able to rotate in relation to each other. The insert 300 is further guided translational in the nut member 370. The thread 307 is fixed rotationally relatively to the nut member 370 and hence to the base part 355 of the housing structure. The internal thread 307 is thus associated with the housing structure.

As disclosed in FIG. 18, the compression spring 389 urges the insert 300 and the inner element 390 in the distal direction when the cartridge holder part 380 is not connected, being the first position comparable to FIG. 11.

Once the user inserts a cartridge 385 into the cartridge holder part 380 and connects the cartridge holder part 385 to the nut member 370, the cartridge 380 engages the insert 300 and moves the insert 300 in the proximal direction as seen in FIG. 19. This movement is transferred to a similar movement of the inner element 390. The outwardly pointing teeth 392 on the inner element 390 henceforth moves into engagement with the inwardly pointing teeth 396 on the outer element 395.

During injection, when the clutch 360 rotates the outer element 395, this rotation is transferred to a similar rotation of the inner element 390 and the piston rod 330.

Since the insert 300 is the slidable element in this example and is threaded to the piston rod 330, the piston rod 330 is also slided axially together with the insert 300 and the inner element 390. This has the effect that once the plunger 381 inside the cartridge 380 reaches contact with the piston rod 330 or the piston rod foot 333, both the insert 300 and the piston rod 330 is moved proximally until the inner element 390 obtains contact with the outer element 395. This secures that a proper contact is established before the inner element 390 is locked to the outer element 395.

It is henceforth the contact between the cartridge 380 and insert 300 that locks the inner element 390 to the outer element 395 and not the position of the plunger 381 and the piston rod foot 333.

Fourth Example of the Invention

The individual physical elements in this fourth example being either the same as in the injection device previously disclosed or having a similar function are referenced by the same reference number with a "4" in front. The piston rod is thus in the following example disclosed in FIG. 20 to 24 provided with the reference "430".

Figure 20:
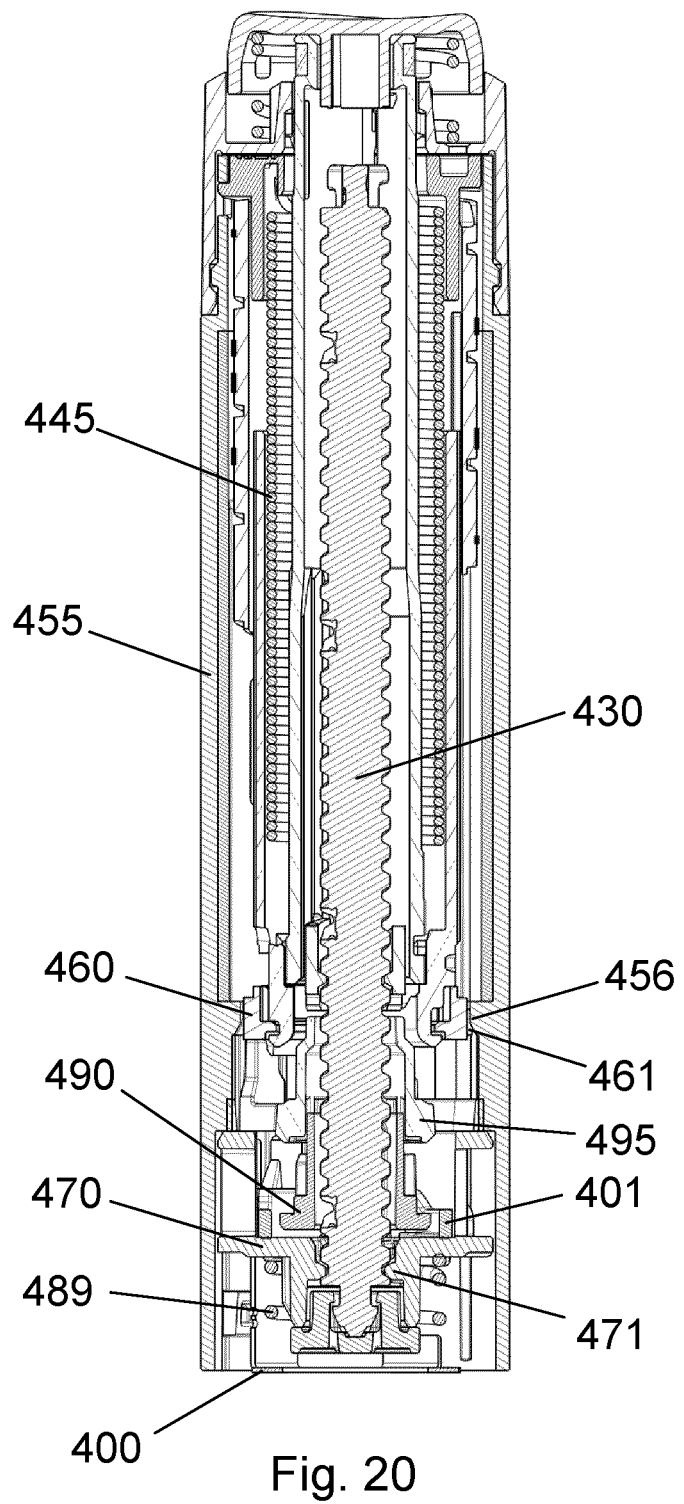
FIG. 20 show a cross-sectional view of a fourth example of the injection device according to the invention with the with the cartridge older removed and the release mechanism in the first unlocked position FIG. 21 show a cross-sectional view of the fourth example of the injection device according to the invention with the cartridge holder attached and the release mechanism in the second locked position.
Figure 21:
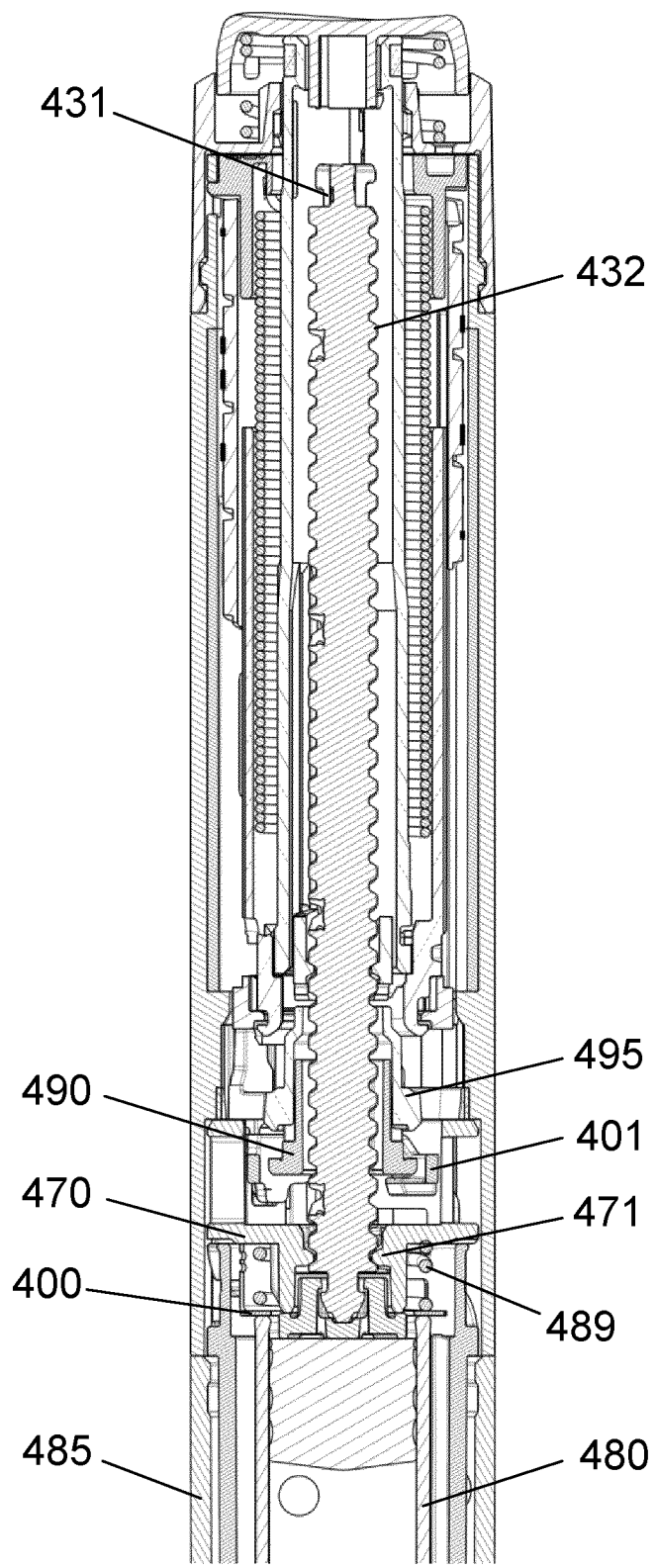

FIG. 20 discloses the dose engine in the state where no cartridge 480 nor cartridge-holder 485 has been attached and FIG. 21 discloses the injection device once the cartridge 480 and the cartridge-holder 485 has been attached The outer thread 432 on the piston rod 430 engages the inner thread 471 in the nut element 470 such that the piston rod 430 is moved helically in the distal direction when the inner element 490 engaging the piston rod 430 is rotated by the outer element 495 which again is rotated by the torsion spring 445. The nut element 470 is preferably press fitted into the base part 455 of the housing structure such that the nut element 470 is inrotatable secured in relation to the base part 455. Alternatively, the nut element 470 can be moulded as an integral part of the base part 455.

As seen by the engagement between the outwardly pointing teeth 461 on the clutch 460 and the inwardly pointing teeth 456 inside the base part 455, the clutch 460 is kept inrotatable during changing of the cartridge 480. Only when the clutch 460 is moved in the distal direction and out of engagement with the inwardly pointing teeth 456 of the base part 455 is the clutch 460 free to rotate the outer element 495.

Figure 22:
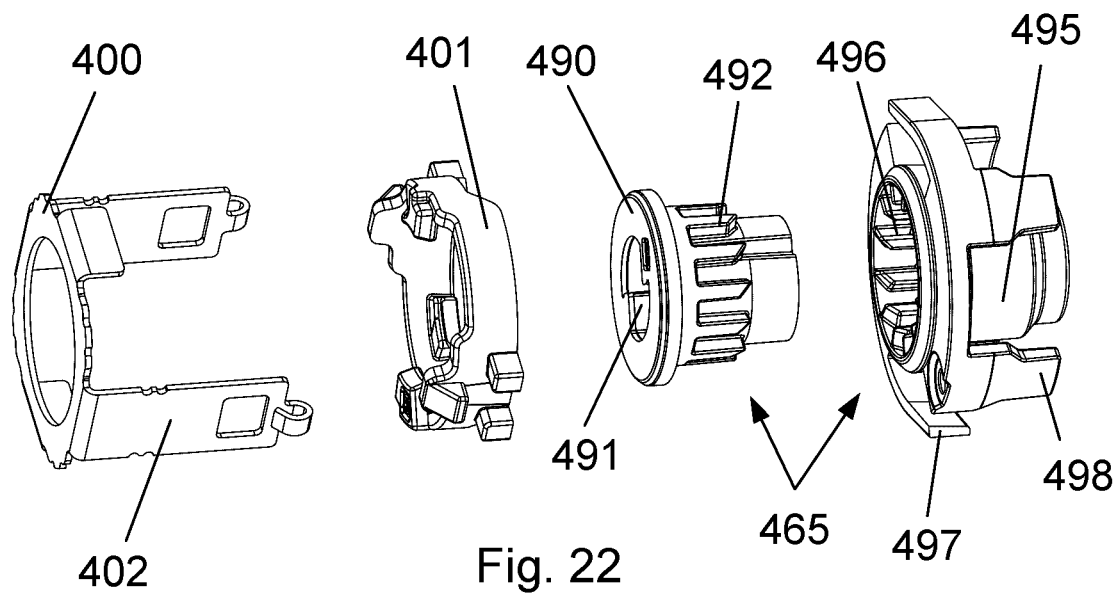
FIG. 22 show an exploded view of the release mechanism.
Figure 23:
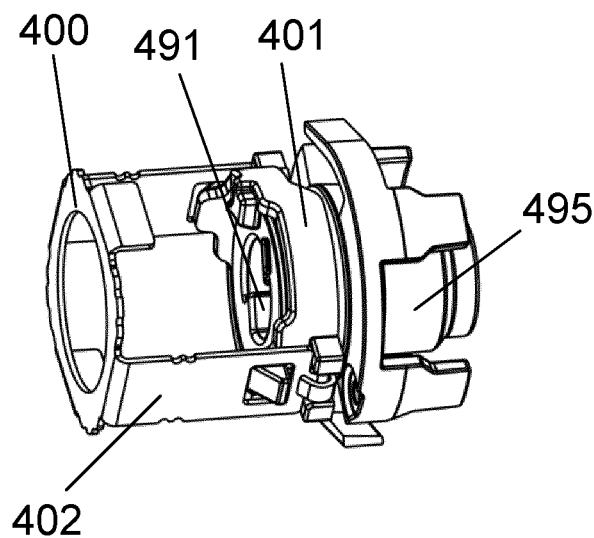
FIG. 23 show a perspective view of the release mechanism in the first unlocked position.
Figure 24:
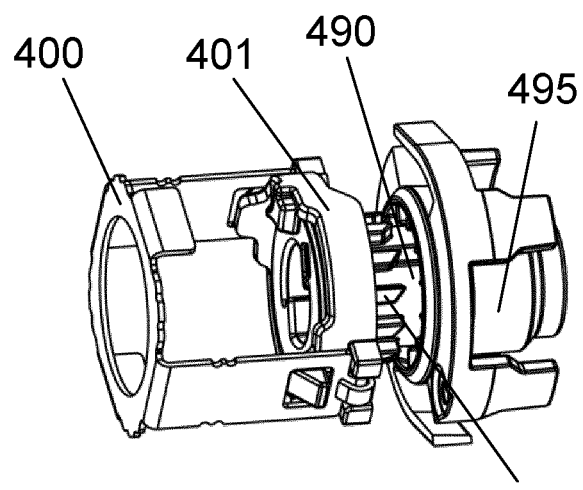
FIG. 24 show a perspective view of the release mechanism in the second locked position.

The release mechanism is best seen in FIG. 22, FIG. 23 and in FIG. 24. Referring to FIG. 22, the piston drive element 465 comprises the outer element 495 and the inner element 490 as in the previous examples. The inner element 490 is coupled to a metal clip 400 via an inner ring 401.

The metal clip 400 is provided with a number of axial legs 402 which engages the inner ring 401 such that the metal clip 400 and the inner ring 401 operates in unison. In the disclosed example a radial opening in the axial legs connects to a number of outwardly pointing protrusions on the inner ring 401. As best seen in FIG. 23 and FIG. 24, the ring element 401 engages the inner element 490 of the piston rod driver 156 such that the inner element 190 moves axially together with the metal clip 400 and the inner ring 401. Preferably, the inner element 490 is click-fitted to the inner ring 401 such that the inner element 490 moves both distally and proximally together with the inner ring 401.

The axial legs 402 of the metal clip 400 operates through openings in the nut element 471 as seen in FIG. 20 and in FIG. 21. The distal part of the metal clip 400 is thus located distal to the nut element 471 whereas the ring element 401 is positioned proximally to the nut element 470. When the cartridge 480 is inserted, the proximal end of the cartridge 480 thus pushes on the distal end of the metal clip 400 as disclosed in FIG. 21.

The inner element 490 is internally provided with inwardly pointing ridges 491 which engages the longitudinal track 431 provided in the piston rod 430 such that a rotation of the inner element 490 is transferred to a similar rotation of the piston rod 430. The inner element 490 is further on its outer surface provided with a plurality of outwardly pointing teeth 492.

These outwardly pointing teeth 492 is able to engage with similar inwardly pointing teeth 496 provided internally in the outer element 195. The outer element 195 further comprises a number of radial click-arms 497 and a number of axial extension arms 498.

The radial click-arms 497 operates in a toothed ring provided on the inner surface of the base part 455 such that the outer element 495 can only rotate in one rotational direction. The allowed direction being the one that moves the piston rod 430 distally.

In the unlocked position disclosed in FIG. 20 and in FIG. 23, the compression spring 489 urges the metal clip 400 is the distal direction. As the metal clip 400 connects to the inner ring 401 which again is connected to the inner element 490, the inner element 490 is pulled in the distal direction by the compression spring 489. As seen in FIG. 23, the outwardly pointing teeth 492 on the inner element is pulled free of the inwardly pointing teeth 496 on the outer element 495 such that the inner element 490 is able to rotate together with the piston rod 430.

During the axial movement of the inner element 490, the inwardly pointing ridges 491 moves axially in the longitudinal track 431 provided in the piston rod 430.

Once the inner element 490 is released from the outer element 495, the user can rotate the piston rod 430 proximally into the base part 455 until the piston rod 430 is back in its initiate position and a new cartridge 480 can be inserted.

In the locked position disclosed in FIG. 21 and in FIG. 24, a cartridge 480 has been inserted into the cartridge holder 485, and the cartridge holder 485 has been attached onto the base part 455 preferably through a bayonet interface.

As best seen in FIG. 21, the cartridge 480 pushes the metal clip 400 in the proximal direction against the bias of the compression spring 489. As the metal clip 400 is connected to the inner ring 401 which again is coupled to the inner element 490, the inner element 490 is moved proximally into engagement with the outer element 495.

Once the outwardly pointing teeth 492 engages the inwardly pointing teeth 496 as disclosed in FIG. 24, the torque stored in the torsion spring 445 can be released by moving the clutch 460 out of engagement with the base part 455 as previously explained to thereby rotate the piston rod guide 465 i.e. the outer element 495 and the inner element 490. The simultaneous rotation of the outer element 495 and the inner element 490 is transferred to a similar rotation of the piston rod 430 which thus move helically in the distal direction due to the threaded connection 432, 471 between the piston rod 430 and the nut element 470.

This fourth example is thus also based on a movable element (the metal clip 400) which is operable connected to the inner element 490 to move the inner element 490 axially from the first uncoupled position to the second coupled position.

Some preferred embodiments have been shown in the foregoing, but it should be stressed that the invention is not limited to these, but may be embodied in other ways within the subject matter defined in the following claims.

The invention claimed is:

1. A reusable torsion spring driven injection device for expelling doses of a liquid drug from a loaded cartridge, comprising:
    a piston rod having an outer surface with an outer thread extending helically in a longitudinal direction and which outer surface further is provided with a longitudinal extending engagement surface such that the outer surface of the piston rod has a non-circular cross section,
    a housing structure comprising:
        a base part comprising a torsion spring driven expelling mechanism for driving the piston rod axially, and
        a removable cartridge holder part holding the cartridge and releasable connectable to the base part,
    wherein the torsion spring driven expelling mechanism comprises:
        a rotatable piston rod driver engaging the engagement surface of the piston rod such that rotation of the rotatable piston rod driver is transmitted to a similar rotation of the piston rod,
        an internal thread associated with the housing structure and engaging the outer thread on the piston rod such that the piston rod is moved helically when rotated, and
        a strained torsion spring holding a torque for rotating the rotatable piston rod driver during dose expelling, and
    wherein, the rotatable piston rod driver comprises an outer element and an inner element releasable coupled together,
        the outer element being maintained stationary during dose setting and rotated by the torque of the torsion spring during dose expelling, and
        the inner element being axially movable relatively to the outer element between a first uncoupled position and a second coupled position,
    the first uncoupled position being a position wherein the inner element is uncoupled from the outer element such that the inner element is rotatable independently of the outer element, and
    the second coupled position being a position wherein the inner element is coupled to the outer element to follow rotation of the outer element,
    and wherein
    a movable element operable connected to the inner element is axially movable to move the inner element axially from the first uncoupled position to the second coupled position.

2. The reusable torsion spring driven injection device according to claim 1, wherein the movable element and the inner element move in unison.

3. The reusable torsion spring driven injection device according to claim 1, wherein the inner element is moved distally into the first uncoupled position by spring structure.

4. The reusable torsion spring driven injection device according to claim 1, wherein the movable element and the inner element is moved proximally into the second coupled position by engagement with the cartridge holder part.

5. The reusable torsion spring driven injection device according to claim 1, 2 or 3, wherein the movable element and the inner element is moved proximally into the second coupled position by engagement with the cartridge.

6. The reusable torsion spring driven injection device according to claim 1, wherein the movable element is a sleeve which is telescopically movable in relation to the housing structure.

7. The reusable torsion spring driven injection device according to claim 6, wherein the sleeve slides axially on the outside of the housing structure.

8. The reusable torsion spring driven injection device according to claim 6, wherein the sleeve is connected to the inner element.

9. The reusable torsion spring driven injection device according to claim 6, wherein the sleeve abuts the cartridge holder part when mounted.

10. The reusable torsion spring driven injection device according to claim 6, wherein a compression spring is encompassed between the sleeve and housing structure urging the sleeve in the distal direction.

11. The reusable torsion spring driven injection device according to claim 5, wherein the movable element is connected to the inner element via an inner ring.

12. The reusable torsion spring driven injection device according to claim 11, wherein the spring structure is encompassed between the movable element and a nut member secured in the base part of the housing structure.

13. The reusable torsion spring driven injection device according to claim 12, wherein the nut member carries the inner thread for the piston rod.

14. The reusable torsion spring driven injection device according to claim 12, wherein the movable element is provided with axial legs operating through openings in the nut member.

* * * * *